United States Patent
Go et al.

(10) Patent No.: US 11,277,286 B1
(45) Date of Patent: Mar. 15, 2022

(54) PAM4 RECEIVER INCLUDING ADAPTIVE CONTINUOUS-TIME LINEAR EQUALIZER AND METHOD OF ADAPTIVELY TRAINING THE SAME USING TRAINING DATA PATTERNS

(71) Applicant: UNIVERSITY OF SEOUL INDUSTRY COOPERATION FOUNDATION, Seoul (KR)

(72) Inventors: Young-Gil Go, Seoul (KR); Hye-Seong Shin, Seoul (KR); Jae-Geol Lee, Seoul (KR); Hyeon-Woo Ahn, Seoul (KR); Yo-Han Kim, Seoul (KR); Yongsam Moon, Gwacheon-si (KR)

(73) Assignee: UNIVERSITY OF SEOUL INDUSTRY COOPERATION FOUNDATION, Seoul (KR)

( * ) Notice: Subject to any disclaimer, the term of this patent is extended or adjusted under 35 U.S.C. 154(b) by 0 days.

(21) Appl. No.: 17/159,912

(22) Filed: Jan. 27, 2021

(30) Foreign Application Priority Data

Sep. 2, 2020 (KR) .......... 10-2020-0111959
Oct. 15, 2020 (KR) .......... 10-2020-0133208

(51) Int. Cl.
*H04L 5/12* (2006.01)
*H04L 25/49* (2006.01)
*H04L 7/10* (2006.01)
*H04L 25/03* (2006.01)

(52) U.S. Cl.
CPC .......... *H04L 25/4917* (2013.01); *H04L 7/10* (2013.01); *H04L 25/03006* (2013.01); *H04L 25/4902* (2013.01); *H04L 2025/0377* (2013.01)

(58) Field of Classification Search
CPC ... H04L 1/0054; H04L 1/005; H04L 27/3863; H04L 27/366; H04L 25/03343; H04L 27/0014; H04L 7/0037; H04B 10/541
USPC ......................... 375/262, 260, 267
See application file for complete search history.

(56) References Cited

U.S. PATENT DOCUMENTS 9,882,706 B1* 1/2018 Lugthart ............... H04L 7/0016
2018/0367350 A1* 12/2018 Zerbe ............... H04L 25/03885
2021/0051049 A1* 2/2021 Bae ..................... H04L 25/4902

FOREIGN PATENT DOCUMENTS

KR 10-2019-0052472 A 5/2019
KR 10-2019-0142608 A 12/2019

OTHER PUBLICATIONS

"A 56-GB/s PAM4 Receiver With Low-Overhead Techniques for Threshold and Edge-Based DFE FIR- and IIR-Tap Adaptation in 65-nm CMOS", Ashkan Roshan-Zamir, IEEE J. Solid-State Circuits, vol. 54, No. 3, Mar. 2019.
"A 0.25-27-GB/s PAM4/NRZ Transceiver With Adaptive Power CDR and Jitter Analysis", Yoshigide Komatsu, IEEE J. Solid-State Circuits, vol. 54, No. 10, Oct. 2019.

* cited by examiner

Primary Examiner — Khai Tran
(74) Attorney, Agent, or Firm — Stein IP, LLC

(57) ABSTRACT

A PAM4 receiver including an adaptive continuous-time linear equalizer and a method for training the same are disclosed. The PAM4 receiver and the method for training the same of the present invention employs a training pattern including a first training data pattern and second training data pattern to adaptively tune the PAM4 receiver to achieve accurate data reception and long-distance, high-speed communication.

18 Claims, 20 Drawing Sheets

<Prior Art>

<Prior Art>

PAM4 RECEIVER INCLUDING ADAPTIVE CONTINUOUS-TIME LINEAR EQUALIZER AND METHOD OF ADAPTIVELY TRAINING THE SAME USING TRAINING DATA PATTERNS

This non-provisional U.S. patent application claims priority under 35 U.S.C. § 119 of Korean Patent Applications No. 10-2020-0111959 filed on Sep. 2, 2020 and No. 10-2020-0133208 filed on Oct. 15, 2020, in the Korean Intellectual Property Office, the entire contents of which are hereby incorporated by reference.

1. Field

The present invention relates to a PAM4 receiver including an adaptive continuous-time linear equalizer and a method for training the same, and more particularly, a PAM4 receiver including an adaptive continuous-time linear equalizer and a method for adaptively training the same using training patterns.

2. Description of the Related Art

Various methods are used in order to transmit digital signals at high speed. While binary data are transmitted conventionally, multi-level pulse amplitude modulation (PAM) has been proposed to transmit digital data at high speed.

FIG. 1A through FIG. 1C are diagrams illustrating waveforms of binary PAM (PAM2) and multi-level PAM (PAM4, PAM8) signals, respectively.

FIG. 1A illustrates binary data having values '0' and '1'. That is, in FIG. 1A, a two-level PAM (PAM2) signal is illustrated. While PAM2 signal is robust to noise, PAM2 has a limitation in increasing the data rate.

In order to overcome the limitation of PAM2, PAM4 and PAM8 have been proposed.

As shown in FIG. 1B, in PAM4, data having values of '00', '01', '10' and '11' are modulated into a signal with four data levels.

Similarly, as shown in FIG. 1C, in PAM8, data having values of '000', '001', '010', '011', '100', '101', '110' and '111' are modulated into a signal with eight data levels.

As a result, in PAM4 and PAM8, data may be transmitted at two and three times faster when compared to PAM2, respectively. However, PAM4 and PAM8 are more susceptible to attenuation and noise when compared to PAM2. Therefore, an equalizer for equalizing the received signal is needed in PAM4 and PAM8.

FIG. 2 is a block diagram illustrating a conventional PAM4 receiver.

Referring to FIG. 2, the conventional PAM4 receiver 100 includes a continuous-time linear equalizer (CTLE) 110, a sampler 120, a demultiplexer (DEMUX) 130 and a clock-and-data recovery (CDR) 140.

The CTLE 110 equalizes the received signal.

FIG. 3 is a circuit diagram illustrating the CTLE 110 shown in FIG. 2 in detail.

Referring to FIG. 3, the CTLE 110 is basically a differential amplifier circuit, and includes a capacitor $C_s$ and a resistor $R_s$ connected in parallel between the sources of the transistors.

The amplification gain of the high frequency component of the received signal is determined by the capacitance of the capacitor $C_s$, and the amplification gain of the low frequency component of the received signal is determined by the resistance of the resistor $R_s$.

The capacitance of the capacitor $C_s$ and the resistance of the resistor $R_s$ may be selected according to the degree of attenuation of the received signal.

FIG. 4 is a diagram illustrating a waveform of a signal CTLE_out according to the capacitance of the capacitor $C_s$ and the resistance of the resistor $R_s$.

Referring to FIG. 4, when the transmitted data "00", "00", "11" "11", "11" "11", "00", "00" are not equalized (meaning $C_s$=0) after receiving the same, a signal CTLE_out having a waveform denoted as (i) in FIG. 4 is obtained due to the attenuation of the high frequency component.

When only the capacitance of the capacitor $C_s$ is increased ("normal $C_s$") with respect to (i) in FIG. 4, a signal CTLE_out having a waveform denoted as (ii) in FIG. 4 is obtained with an increase in the high frequency component.

When only the capacitance of the capacitor $C_s$ is further increased ("large $C_s$") with respect to (ii) in FIG. 4, a signal CTLE_out having a waveform denoted as (iii) in FIG. 4 is obtained with a more increase in the high frequency (HF) component.

When the resistance of the resistor $R_s$ is increased ("large $R_s$") with respect to (iii) in FIG. 4, a signal CTLE_out having a waveform denoted as (iv) in FIG. 4 is obtained with a decrease in the low frequency (LF) component. The signal CTLE_out denoted as (iii) in FIG. 4 is shown in dotted line for comparison.

When the resistance of the resistor $R_s$ is decreased ("small $R_s$") with respect to (iii) in FIG. 4, a signal CTLE_out having a waveform denoted as (v) in FIG. 4 is obtained with an increase in the low frequency component. The signal CTLE_out denoted as (iii) in FIG. 4 is shown in dotted line for comparison.

Here, (ii) in FIG. 4 represents under equalization, and (iii), (iv) and (v) in FIG. 4 represent over-equalizations. As shown, the high frequency component increases by equalization as the capacitance of the capacitor $C_s$ increases, and the low frequency component decreases by equalization as the resistance of the resistor $R_s$ increases.

The sampler 120 samples the output signal CTLE_out of the CTLE 110.

The sampler 120 may be embodied by the circuit exemplified in FIG. 5.

FIG. 5 illustrates an example sampler used in PAM4 receiver.

As shown in FIG. 5, the signal CTLE_out is inputted to the three adders 124-1, 124-2 and 124-3, and the adders 124-1, 124-2 and 124-3 outputs the difference between: the signal CTLE_out; and the threshold voltages $V_{TH01}$, $V_{TH12}$ and $V_{TH23}$, respectively.

The difference between the signal CTLE_out and the threshold voltage $V_{TH01}$ is inputted to flip-flops 121-1, 121-2, 121-3 and 121-4, the difference between the signal CTLE_out and the threshold voltage $V_{TH12}$ is inputted to flip-flops (122-1, 122-2, 122-3 and 122-4, and the difference between the signal CTLE_out and the threshold voltage $V_{TH23}$ is inputted to flip-flops 123-1, 123-2, 123-3 and 123-4.

The flip-flops 121-1, 121-2, 121-3 and 121-4 sample the difference between the signal CTLE_out and the threshold voltage $V_{TH01}$, at the rising edges of the clock signals DCK, DCKB, XCK and XCKB, respectively and output the sampled values as signals DET[0], DOT[0], XET[0] and XOT[0], respectively.

The flip-flops 122-1, 122-2, 122-3 and 122-4 sample the difference between the signal CTLE_out and the threshold voltage $V_{TH02}$ at the rising edges of the clock signals DCK, DCKB, XCK and XCKB, respectively and output the sampled values as signals DET[1], DOT[1], XET[1] and XOT[1], respectively.

The flip-flops 123-1, 123-2, 123-3 and 123-4 sample the difference between the signal CTLE_out and the threshold voltage $V_{TH23}$ at the rising edges of the clock signals DCK, DCKB, XCK and XCKB, respectively and output the sampled values as signals DET[2], DOT[2], XET[2] and XOT[2], respectively.

FIG. 6 is a waveform diagram illustrating signals in the conventional PAM4 receiver, wherein an example "transmitted data", the signal CTLE_out outputted by the PAM4 receiver corresponding to the received "transmitted data", and the clock signals DCK, DCKB, XCK and XCKB for sampling the signal CTLE_out are shown.

Referring to FIG. 6, while "transmitted data" is a PAM4 signal without distortion, the received signal contains distortion due to the attenuation of a high frequency component occurring during transmission. As a result, the received signal may not be regarded as an unimpaired PAM4 signal. Therefore, the received signal requires equalization by the CTLE 110 shown in FIG. 2. The signal equalized by the CTLE 110 is outputted as the signal CTLE_out and then inputted to the sampler 120. As shown in FIG. 6, the signal CTLE_out is a signal having the high frequency component of the received signal compensated.

Here, the data level of value "00" is denoted as $dlev_0$, the data level of value "01" is denoted as $dlev_1$, the data level of value "10" is denoted as $dlev_2$, and the data level of value "11" is denoted as $dlev_3$. The threshold voltage $V_{TH01}$ is the average value of the data level $dlev_0$ and the data level $dlev_1$, the threshold voltage $V_{TH12}$ is the average value of the data level $dlev_1$ and the data level $dlev_2$, and the threshold voltage $V_{TH23}$ is the average value of the data level $dlev_2$ and data level $dlev_3$.

The sampler 120 samples the signal CTLE_out according to the clock signals DCK, DCKB, XCK and XCKB shown in FIG. 6.

Referring to FIG. 6, the clock signal DCK is a clock signal for sampling the signal CTLE_out at the center of the symbol, and the clock signal DCKB is an inverted signal of the clock signal DCK with one half period difference between the rising edges of the clock signals DCKB and DCK for sampling the signal CTLE_out at the center of the symbol similar to the clock signal DCK. The signal CTLE_out is sampled once in each period alternately according to the clock signals DCK and DCKB.

On the other hand, the clock signal XCK is a clock signal for sampling the signal CTLE_out at the transition section thereof, and the clock signal XCKB is an inverted signal of the clock signal XCK with one half period difference between the rising edges of the clock signals XCKB and XCK for sampling the signal CTLE_out at the transition section thereof similar to the clock signal XCK. The transition section of the signal CTLE_out is sampled once in each period alternately according to the clock signals XCK and XCKB.

Referring back to FIG. 5, when the signal CTLE_out is sampled according to the clock signals DCK, DCKB, XCK and XCKB, signals DET[2:0], DOT[2:0], XET[2:0] and XOT[2:0] are obtained.

In the clock signals DCK, DCKB, XCK and XCKB, 'D' signifies clock signal for sampling at the center of the symbol of the signal CTLE_out, and 'X' signifies clock signal for sampling at the transition section of the signal CTLE_out. In the signals DET[2:0], DOT[2:0], XET[2:0] and XOT[2:0], 'D' signifies data obtained by sampling at the center of the symbol of the signal CTLE_out, 'X' signifies data obtained by sampling at the transition section of the signal CTLE_out, 'E' signifies the even-numbered data, and 'O' signifies the odd-numbered data. In addition, 'T' signifies that the signals DET[2:0], DOT[2:0], XET[2:0], XOT[2:0] are thermometer codes as shown in Table 1 below.

TABLE 1

| data level of CTLE_out (binary code) | Signals DET[2:0], DOT[2:0], XET[2:0] and XOT[2:0] (thermometer code) |
|---|---|
| "00" | "000" |
| "01" | "001" |
| "10" | "011" |
| "11" | "111" |

The signal DET[2:0] and DOT[2:0] indicate where the voltage level of the signal CTLE_out falls among the PAM4 data levels. The signal XET[2:0] and XOT[2:0] indicate the data levels of the transition section sampled according to the clock signal XCK and XCKB.

The DEMUX 130 parallelizes the output signal of the sampler 120 and outputs the parallelized output signal of the sampler 120 as the signal DATA_out.

Specifically, the DEMUX 130 parallelizes the signals DET[2:0], DOT[2:0], XET[2:0], XOT[2:0] according to a predetermined clock signal, and outputs the parallelized output signal of the sampler 120 as the signal DATA_out. More specifically, since the signals DET[2:0], DOT[2:0], XET[2:0] and XOT[2:0] are not simultaneously outputted, the signals DET[2:0], DOT[2:0], XET[2:0] and XOT[2:0] are parallelized (synchronized) according to the predetermined clock signal and outputted as the signal DATA_out.

In addition, the DEMUX 130 provides the signal DATA_out to the CDR 140.

The CDR (Clock-and-Data Recovery) 140 provides the sampling clock signal DCK, XCK, DCKB and XCKB to the sampler 120.

Specifically, the CDR 140 adjusts timing or phase of the sampling clock signals DCK, XCK, DCKB and XCKB according to the signals DET[2:0], DOT[2:0], XET[2:0] and XOT[2:0].

While the conventional PAM4 receiver is capable of equalization by adjusting $R_s$ and $C_s$, the equalization cannot be performed adaptively, resulting in being unable to perform equalization according to received data.

SUMMARY OF THE INVENTION

It is an object of the present invention to provide a PAM4 receiver including an adaptive continuous-time linear equalizer and a method for adaptively training the same using training patterns.

According to one aspect of the present invention, there is provided a PAM4 receiver comprising: a linear equalizer receiving a signal containing: (i) a first training data pattern containing data "00" and consecutively arranged first data "11" through min data "11"; and (ii) a second training data pattern including one of data "01", data "10" and combinations thereof, and equalizing the signal according to an equalization parameter of the linear equalizer including a high frequency amplification gain and a low frequency amplification gain, and outputting a signal CTLE_out containing equalized first training data pattern and equalized second training data pattern; a sampler sampling: (i) a difference $dlev_{3HD}$; (ii) a difference $dlev_{3LD}$; and (iii) a difference $dlev_{1D}$ or $dlev_{2D}$, and outputting sampled differences as a signal SAMPLE_out, wherein the difference $dlev_{3HD}$ is a difference between: a first voltage level of the signal CTLE_out corresponding to the first data "11" of the equalized first training data pattern when a transition from the data "00" to the first data "11" occurs; and an upper limit $dlev_{3H}$, the difference $dlev_{3LD}$ is a difference between: a second voltage level of the signal CTLE_out corresponding to one of second data "11" through the $m^{th}$ data "11" of the equalized first training data pattern; and a lower limit $dlev_{3L}$, the difference $dlev_{1D}$ is a difference between: a third voltage level of the signal CTLE_out corresponding to the data "01" of the equalized second training data pattern; and the data level $dlev_1$ corresponding to the data "01", and the difference $dlev_{2D}$ is a difference between: a fourth voltage level of the signal CTLE_out corresponding to the data "10" of the equalized second training data pattern; and the data level $dlev_2$ corresponding to data "10"; a DEMUX parallelizing the signal SAMPLE_out, and outputting parallelized signal SAMPLE_out as a signal DATA_out; a CDR providing a clock signal for sampling to the sampler and the DEMUX; and a controller: (i) adaptively adjusting a high frequency amplification gain and a low frequency amplification gain of the linear equalizer by generating and providing a signal $EQ\_AC[N_{AC}-1:0]$ and a signal $EQ\_DC[N_{DC}-1:0]$ for adjusting the high frequency amplification gain and low frequency amplification gain based on the difference $dlev_{3HD}$ and the difference $dlev_{3LD}$ in the signal DATA_out, respectively; and (ii) providing the sampler with threshold voltages $V_{TH01}$, $V_{TH12}$ and $V_{TH23}$, the data level $dlev_1$ or $dlev_2$, and the upper limit $dlev_{3H}$ and the lower limit $dlev_{3L}$, wherein the threshold voltages $V_{TH01}$, $V_{TH12}$ and $V_{TH23}$ are calculated from: a data level $dlev_0$ corresponding to the data "00"; the data level $dlev_1$ or $dlev_2$; and a data level $dlev_3$ corresponding to the data "11", the data levels $dlev_1$ and $dlev_2$ are determined from the differences $dlev_{1D}$ and $dlev_{2D}$, respectively; and the data level $dlev_3$ is determined from the upper limit $dlev_{3H}$ and the lower limit $dlev_{3L}$ (where m is a natural number equal to or greater than 2, and $N_{AC}$ and $N_{DC}$ are natural numbers, respectively).

Preferably, the linear equalizer comprises: a differential amplifier provided with transistors; $N_{AC}$ capacitors $C_{unit}$ connected between sources of the transistors; and $N_{DC}$ resistors $R_{unit}$ connected between the sources of the transistors, and the controller selectively turns on the $N_{AC}$ capacitors $C_{unit}$ according to the signal $EQ\_AC[N_{AC}-1:0]$ to adaptively adjust the high frequency amplification gain, and selectively turns on the $N_{DC}$ resistor $R_{unit}$ according to the signal $EQ\_DC[N_{DC}-1:0]$ to adaptively adjust the low frequency amplification gain.

Preferably, the controller lowers the upper limit $dlev_{3H}$ and the lower limit $dlev_{3L}$ when the first voltage level of the signal CTLE_out is lower than the upper limit $dlev_{3H}$ even with the high frequency amplification gain at maximum by turning on an entirety of the $N_{AC}$ capacitors $C_{unit}$.

Preferably, the controller: determines the data level $dlev_1$ or $dlev_2$ based on a sign of the difference $dlev_{1D}$ or $dlev_{2D}$; and provides the sampler with the threshold voltages $V_{TH01}$, $V_{TH12}$ and $V_{TH23}$ thereof calculated according to equations $$dlev_3 = \frac{dlev_{3H} + dlev_{3L}}{2}, V_{TH01} = \frac{dlev_0 + dlev_1}{2},$$

$$V_{TH12} = \frac{dlev_1 + dlev_2}{2} \text{ and } V_{TH23} = \frac{dlev_2 + dlev_3}{2}.$$

According to another aspect of the present invention, there is provided a PAM4 receiver comprising: a linear equalizer receiving a signal containing: (i) a first training data pattern containing data "11" and consecutively arranged first data "00" through min data "00"; and (ii) a second training data pattern including one of data "01", data "10" and combinations thereof, and equalizing the signal according to an equalization parameter of the linear equalizer including a high frequency amplification gain and a low frequency amplification gain, and outputting a signal CTLE_ out containing equalized first training data pattern and equalized second training data pattern; a sampler sampling: (i) a difference $dlev_{0LD}$; (ii) a difference $dlev_{0HD}$; and (iii) a difference $dlev_{1D}$ or $dlev_{2D}$, and outputting sampled differences as a signal SAMPLE_out, wherein the difference $dlev_{0LD}$ is a difference between: a first voltage level of the signal CTLE_out corresponding to the first data "00" of the equalized first training data pattern when a transition from the data "11" to the first data "00" occurs; and a lower limit $dlev_{0L}$, the difference $dlev_{0HD}$ is a difference between: a second voltage level of the signal CTLE_out corresponding to one of second data "00" through the min data "00" of the equalized first training data pattern; and an upper limit $dlev_{0H}$, the difference $dlev_{2D}$ is a difference between: a third voltage level of the signal CTLE_out corresponding to the data "10" of the equalized second training data pattern; and the data level $dlev_2$ corresponding to the data "10", and the difference $dlev_{1D}$ is a difference between: a fourth voltage level of the signal CTLE_out corresponding to the data "01" of the equalized second training data pattern; and the data level $dlev_1$ corresponding to data "01"; a DEMUX parallelizing the signal SAMPLE_out, and outputting parallelized signal SAMPLE_out as a signal DATA_out; a CDR providing a clock signal for sampling to the sampler and the DEMUX; and a controller: (i) adaptively adjusting a high frequency amplification gain and a low frequency amplification gain of the linear equalizer by generating and providing a signal $EQ\_AC[N_{AC}-1:0]$ and a signal $EQ\_DC[N_{DC}-1:0]$ for adjusting the high frequency amplification gain and low frequency amplification gain based on the difference $dlev_{0LD}$ and the difference $dlev_{0HD}$ in the signal DATA_out, respectively; and (ii) providing the sampler with threshold voltages $V_{TH01}$, $V_{TH12}$ and $V_{TH23}$, the data level $dlev_1$ or $dlev_2$, and the upper limit $dlev_{0H}$ and the lower limit $dlev_{0L}$, wherein the threshold voltages $V_{TH01}$, $V_{TH12}$ and $V_{TH23}$ are calculated from: a data level $dlev_0$ corresponding to the data "00"; the data level $dlev_1$ or $dlev_2$; and a data level $dlev_3$ corresponding to the data "11", the data levels $dlev_1$ and $dlev_2$ are determined from the differences $dlev_{1D}$ and $dlev_{2D}$, respectively; and the data level $dlev_0$ is determined from the lower limit $dlev_{0L}$ and the upper limit $dlev_{0H}$ (where m is a natural number equal to or greater than 2, and $N_{AC}$ and $N_{DC}$ are natural numbers, respectively).

Preferably, the linear equalizer comprises: a differential amplifier provided with transistors; $N_{AC}$ capacitors $C_{unit}$ connected between sources of the transistors; and $N_{DC}$ resistors $R_{unit}$ connected between the sources of the transistors, and the controller selectively turns on the $N_{AC}$ capacitors $C_{unit}$ according to the signal $EQ\_AC[N_{AC}-1:0]$ to adaptively adjust the high frequency amplification gain, and selectively turns on the $N_{DC}$ resistor $R_{unit}$ according to the signal $EQ\_DC[N_{DC}-1:0]$ to adaptively adjust the low frequency amplification gain.

Preferably, the controller elevates the upper limit $dlev_{0H}$ and the lower limit $dlev_{0L}$ when the first voltage level of the signal CTLE_out is higher than the lower limit $dlev_{0L}$ even with the high frequency amplification gain at maximum by turning on an entirety of the $N_{AC}$ capacitors $C_{unit}$.

Preferably, the controller: determines the data level $dlev_1$ or $dlev_2$ based on a sign of the difference $dlev_{1D}$ or $dlev_{2D}$;

and provides the sampler with the threshold voltages $V_{TH01}$, $V_{TH12}$ and $V_{TH23}$ thereof calculated according to equations $$dlev_0 = \frac{dlev_{0H} + dlev_{0L}}{2}, V_{TH01} = \frac{dlev_0 + dlev_1}{2},$$

$$V_{TH12} = \frac{dlev_1 + dlev_2}{2} \text{ and } V_{TH23} = \frac{dlev_2 + dlev_3}{2}.$$

According to yet another aspect of the present invention, there is provided a method of training a PAM4 receiver comprising a linear equalizer, a sampler, a DEMUX and a controller, the method comprising: (a) receiving a signal containing: (i) a first training data pattern containing data "00" and consecutively arranged first data "11" through m[th] data "11"; and (ii) a second training data pattern including one of data "01", data "10" and combinations thereof; (b) equalizing the signal received in step (a) according to an equalization parameter of the linear equalizer including a high frequency amplification gain and a low frequency amplification gain, and outputting a signal CTLE_out containing equalized first training data pattern and equalized second training data pattern; (c) sampling: (i) a difference $dlev_{3HD}$; (ii) a difference $dlev_{3LD}$; and (iii) a difference $dlev_{1D}$ or $dlev_{2D}$ according to a sampling parameter of the sampler, and outputting sampled differences as a signal SAMPLE_out, wherein the difference $dlev_{3HD}$ is a difference between: a first voltage level of the signal CTLE_out corresponding to the first data "11" of the equalized first training data pattern when a transition from the data "00" to the first data "11" occurs; and an upper limit $dlev_{3H}$, the difference $dlev_{3LD}$ is a difference between: a second voltage level of the signal CTLE_out corresponding to one of second data "11" through the min data "11" of the equalized first training data pattern; and a lower limit $dlev_{3L}$, the difference $dlev_{1D}$ is a difference between: a third voltage level of the signal CTLE_out corresponding to the data "01" of the equalized second training data pattern; and the data level $dlev_1$ corresponding to the data "01", and the difference $dlev_{2D}$ is a difference between: a fourth voltage level of the signal CTLE_out corresponding to the data "10" of the equalized second training data pattern; and the data level $dlev_2$ corresponding to data "10"; (d) parallelizing the signal SAMPLE_out, and outputting parallelized signal SAMPLE_ out as a signal DATA_out; (e) generating a signal $EQ\_AC[N_{AC}-1:0]$ and a signal $EQ\_DC[N_{DC}-1:0]$ for adjusting the high frequency amplification gain and low frequency amplification gain based on the difference $dlev_{3HD}$ and the difference $dlev_{3LD}$ in the signal DATA_out, respectively; (f) generating threshold voltages $V_{TH01}$, $V_{TH12}$ and $V_{TH23}$ of the sampler by calculating the threshold voltages $V_{TH01}$, $V_{TH12}$ and $V_{TH23}$ from: a data level $dlev_0$ corresponding to the data "00"; the data level $dlev_1$ or $dlev_2$; and a data level $dlev_3$ corresponding to the data "11", wherein the data level $dlev_1$ or $dlev_2$ is determined from the difference $dlev_{1D}$ or $dlev_{2D}$, respectively, and the data level $dlev_3$ is determined from the upper limit $dlev_{3H}$ and the lower limit $dlev_{3L}$; (g) adaptively adjusting the equalization parameter including the high frequency amplification gain and low frequency amplification using the signal EQ_AC $[N_{AC}-1:0]$ and signal $EQ\_DC[N_{DC}-1:0]$ generated in step (e); and (h) adaptively adjusting the sampling parameter of the sampler according to the threshold voltages $V_{TH01}$, $V_{TH12}$ and $V_{TH23}$, the data level $dlev_1$ or $dlev_2$, and the upper limit $dlev_{3H}$ and the lower limit $dlev_{3L}$ generated in step (f) (where m is a natural number equal to or greater than 2, and $N_{AC}$ and $N_{DC}$ are natural numbers, respectively).

Preferably, the method further comprises: performing step (a) through step (d) after performing step (a) through step (h) based on the equalization parameter and the sampling parameter adaptively adjusted in step (g) and step (h), respectively.

Preferably, step (f) comprises: (f-1) determining the data level $dlev_1$ or $dlev_2$ based on a sign of the difference $dlev_{1D}$ or $dlev_{2D}$; and (f-2) calculating the threshold voltages $V_{TH01}$, $V_{TH12}$ and $V_{TH23}$ according to equations $$dlev_3 = \frac{dlev_{3H} + dlev_{3L}}{2} V_{TH01} = \frac{dlev_0 + dlev_1}{2}, \text{ and}$$

$$V_{TH12} = \frac{dlev_1 + dlev_2}{2} V_{TH23} = \frac{dlev_2 + dlev_3}{2}.$$

Preferably, step (g) comprises: (g-1) selectively turning on $N_{AC}$ capacitors $C_{unit}$ provided in the linear equalizer according to the signal $EQ\_AC[N_{AC}-1:0]$ to adaptively adjust the high frequency amplification gain; and (g-2) selectively turning on $N_{DC}$ resistor $R_{unit}$ provided in the linear equalizer according to the signal $EQ\_DC[N_{DC}-1:0]$ to adaptively adjust the low frequency amplification gain.

Preferably, step (g) further comprises: (g-3) lowering the upper limit $dlev_{3H}$ and the lower limit $dlev_{3L}$ when the first voltage level of the signal CTLE_out is lower than the upper limit $dlev_{3H}$ even with the high frequency amplification gain at maximum by turning on an entirety of the $N_{AC}$ capacitors $C_{unit}$.

According to yet another aspect of the present invention, there is provided a method of training a PAM4 receiver comprising a linear equalizer, a sampler, a DEMUX and a controller, the method comprising: (a) receiving a signal containing: (i) a first training data pattern containing data "11" and consecutively arranged first data "00" through m[th] data "00"; and (ii) a second training data pattern including one of data "01", data "10" and combinations thereof; (b) equalizing the signal received in step (a) according to an equalization parameter of the linear equalizer including a high frequency amplification gain and a low frequency amplification gain, and outputting a signal CTLE_out containing equalized first training data pattern and equalized second training data pattern; (c) sampling: (i) a difference $dlev_{0LD}$; (ii) a difference $dlev_{0HD}$; and (iii) a difference $dlev_{1D}$ or $dlev_{2D}$ according to a sampling parameter of the sampler, and outputting sampled differences as a signal SAMPLE_out, wherein the difference $dlev_{0LD}$ is a difference between: a first voltage level of the signal CTLE_out corresponding to the first data "00" of the equalized first training data pattern when a transition from the data "11" to the first data "00" occurs; and a lower limit $dlev_{0L}$, the difference $dlev_{0HD}$ is a difference between: a second voltage level of the signal CTLE_out corresponding to one of second data "00" through the mth data "00" of the equalized first training data pattern; and an upper limit $dlev_{0H}$, the difference $dlev_{2D}$ is a difference between: a third voltage level of the signal CTLE_out corresponding to the data "10" of the equalized second training data pattern; and the data level $dlev_2$ corresponding to the data "10", and the difference $dlev_{1D}$ is a difference between: a fourth voltage level of the signal CTLE_out corresponding to the data "01" of the equalized second training data pattern; and the data level $dlev_1$ corresponding to data "01"; (d) parallelizing the signal SAMPLE_out, and outputting parallelized signal SAMPLE_out as a signal DATA_out; (e) generating a signal EQ_AC[$N_{AC}$−1:0] and a signal EQ_DC[$N_{DC}$−1:0] for adjusting the high frequency amplification gain and low frequency amplification gain based on the difference $dlev_{OLD}$ and the difference $dlev_{OHD}$ in the signal DATA_out, respectively; (f) generating threshold voltages $V_{TH01}$, $V_{TH12}$ and $V_{TH23}$ of the sampler by calculating the threshold voltages $V_{TH01}$, $V_{TH12}$ and $V_{TH23}$ from: a data level $dlev_0$ corresponding to the data "00"; the data level $dlev_1$ or $dlev_2$; and a data level $dlev_3$ corresponding to the data "11", wherein the data level $dlev_1$ or $dlev_2$ is determined from the difference $dlev_{1D}$ or $dlev_{2D}$, respectively, and the data level $dlev_0$ is determined from the lower limit $dlev_{0L}$ and the upper limit $dlev_{0H}$; (g) adaptively adjusting the equalization parameter including the high frequency amplification gain and low frequency amplification using the signal EQ_AC[$N_{AC}$−1:0] and signal EQ_DC[$N_{DC}$−1:0] generated in step (e); and (h) adaptively adjusting the sampling parameter of the sampler according to the threshold voltages $V_{TH01}$, $V_{TH12}$ and $V_{TH23}$, the data level $dlev_1$ or $dlev_2$, and the lower limit $dlev_{0L}$ and the upper limit $dlev_{0H}$ generated in step (f) (where m is a natural number equal to or greater than 2, and $N_{AC}$ and $N_{DC}$ are natural numbers, respectively).

Preferably, the method further comprises: performing step (a) through step (d) after performing step (a) through step (h) based on the equalization parameter and the sampling parameter adaptively adjusted in step (g) and step (h), respectively.

Preferably, step (f) comprises: (f-1) determining the data level $dlev_1$ or $dlev_2$ based on a sign of the difference $dlev_{1D}$ or $dlev_{2D}$, respectively, and (f-2) calculating the threshold voltages $V_{TH01}$, $V_{TH12}$ and $V_{TH23}$ according to equations $$dlev_0 = \frac{dlev_{0H} + dlev_{0L}}{2}, V_{TH01} = \frac{dlev_0 + dlev_1}{2},$$
$$V_{TH12} = \frac{dlev_1 + dlev_2}{2} \text{ and } V_{TH23} = \frac{dlev_2 + dlev_3}{2}.$$

Preferably, step (g) comprises: (g-1) selectively turning on $N_{AC}$ capacitors $C_{unit}$ provided in the linear equalizer according to the signal EQ_AC[$N_{AC}$−1:0] to adaptively adjust the high frequency amplification gain; and (g-2) selectively turning on $N_{DC}$ resistor $R_{unit}$ provided in the linear equalizer according to the signal EQ_DC[$N_{DC}$−1:0] to adaptively adjust the low frequency amplification gain.

Preferably, step (g) further comprises: (g-3) elevating the lower limit $dlev_{0L}$ and the upper limit $dlev_{0H}$ when the first voltage level of the signal CTLE_out is higher than the lower limit $dlev_{0L}$ even with the high frequency amplification gain at maximum by turning on an entirety of the $N_{AC}$ capacitors $C_{unit}$.

DETAILED DESCRIPTION OF THE PREFERRED EMBODIMENTS

Hereinafter, a PAM4 receiver including an adaptive continuous-time linear equalizer and a method for adaptively training the same using training patterns according to the present invention will be described in detail with reference to the accompanying drawings.

Figure 7:
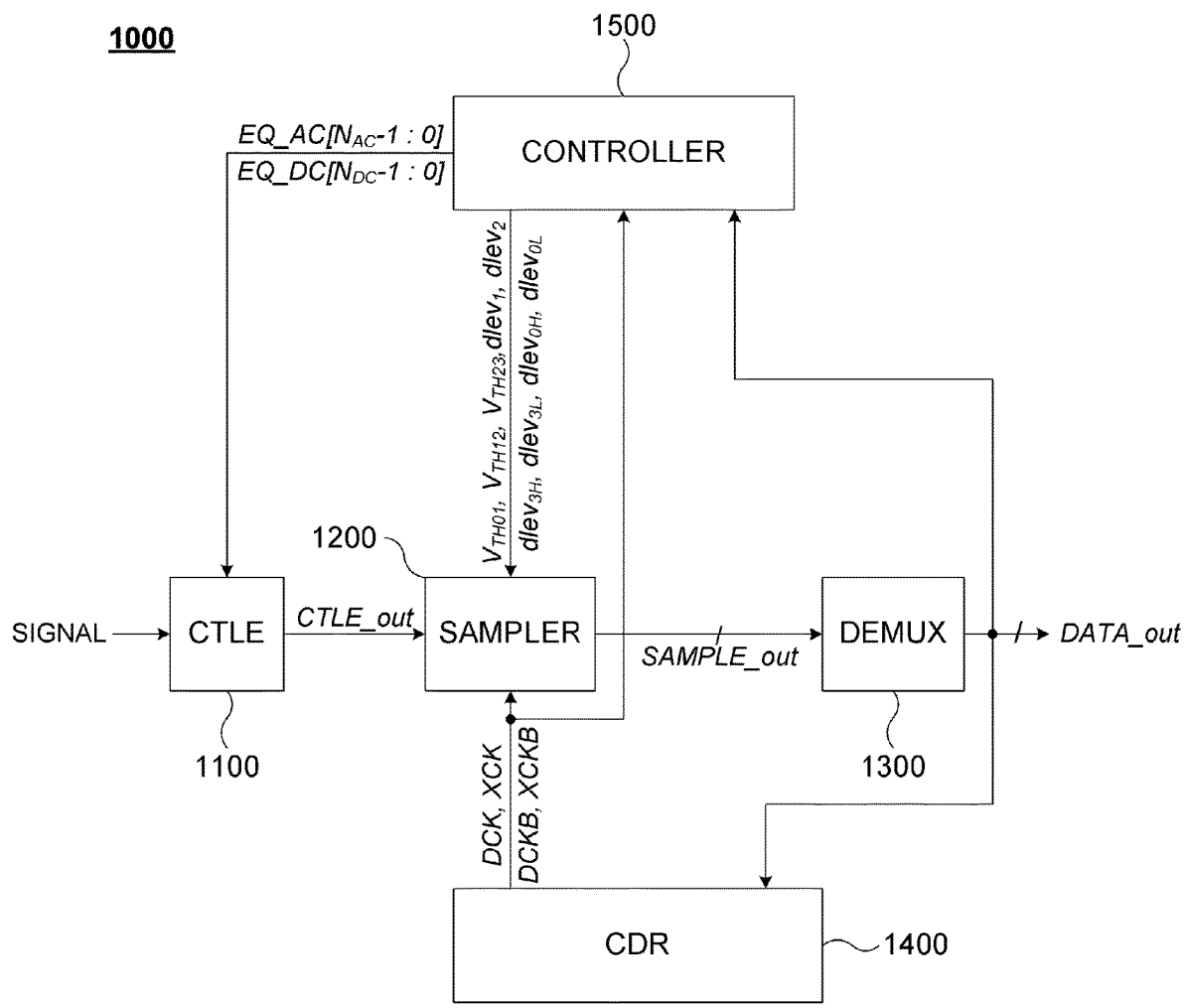
FIG. 7 is a block diagram illustrating a PAM4 receiver according to the present invention.

FIG. 7 is a block diagram illustrating a PAM4 receiver according to the present invention.

Referring to FIG. 7, a PAM4 receiver 1000 according to the present invention includes a continuous-time linear equalizer (CTLE) 1100, a sampler 1200, a DEMUX 1300, a clock-and-data recovery (CDR) 1400 and a controller 1500.

CTLE 1100 equalizes a received signal and outputs an equalized signal CTLE_out.

Figure 8:
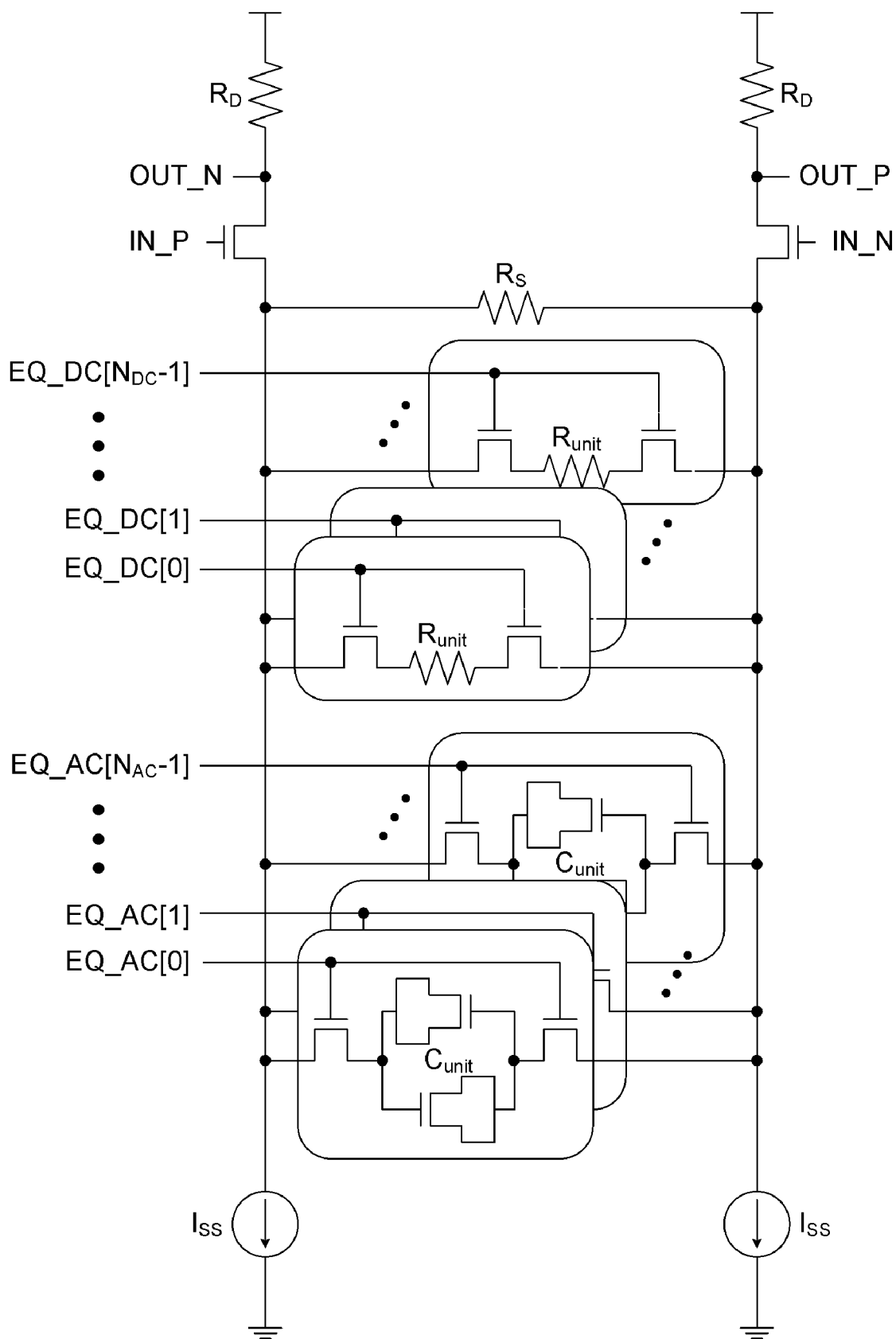
FIG. 8 is a circuit diagram illustrating, in detail, the CTLE of the PAM4 receiver shown in FIG. 7.

FIG. 8 is a circuit diagram illustrating, in detail, the CTLE of the PAM4 receiver 1000 shown in FIG. 7.

Referring to FIG. 8, the CTLE 1100 is basically a differential amplifier circuit, and includes a plurality ($N_{AC}$) of capacitors $C_{unit}$ and a plurality ($N_{DC}$) of resistors $R_{unit}$ connected in parallel to the sources of the transistors (where $N_{AC}$ and $N_{DC}$ are natural numbers, respectively).

The plurality of capacitors $C_{unit}$ are selectively turned on or off by a signal EQ_AC[$N_{AC}$−1:0]. For example, when 8 capacitors $C_{unit}$ are provided and the signal EQ_AC[7:0] has a value of "00001111", 4 capacitors $C_{unit}$ are turned on, and the remaining 4 capacitors $C_{unit}$ are turned off.

The amplification gain of the high frequency component is determined according to the number of capacitors $C_{unit}$ turned on by the signal EQ_AC[$N_{AC}$−1:0] among the plurality of capacitors $C_{unit}$.

A plurality of resistors $R_{unit}$ are selectively turned on or off by a signal EQ_DC[$N_{DC}$−1:0]. For example, when 8 resistors $R_{unit}$ are provided and the signal EQ_DC[7:0] has a value of "00000111", 3 resistors $R_{unit}$ are turned, and the remaining 5 resistors $R_{unit}$ are turned off.

The amplification gain of the low frequency component is determined according to the number of resistors $R_{unit}$ turned on by the signal EQ_DC[$N_{DC}$−1:0] among the plurality of resistors $R_{unit}$.

The signal EQ_AC[$N_{AC}$−1:0] and the signal EQ_DC [$N_{DC}$−1:0] are adaptively generated by the controller 1500.

FIG. 9A through FIG. 9D are diagrams illustrating, in detail, the sampler 1200 of the PAM4 receiver shown in FIG. 7 wherein the sampler 1200 samples the signal CTLE_out and outputs a signal SAMPLE_out which basically corresponds to the sampled CTLE_out.

Figure 9A:
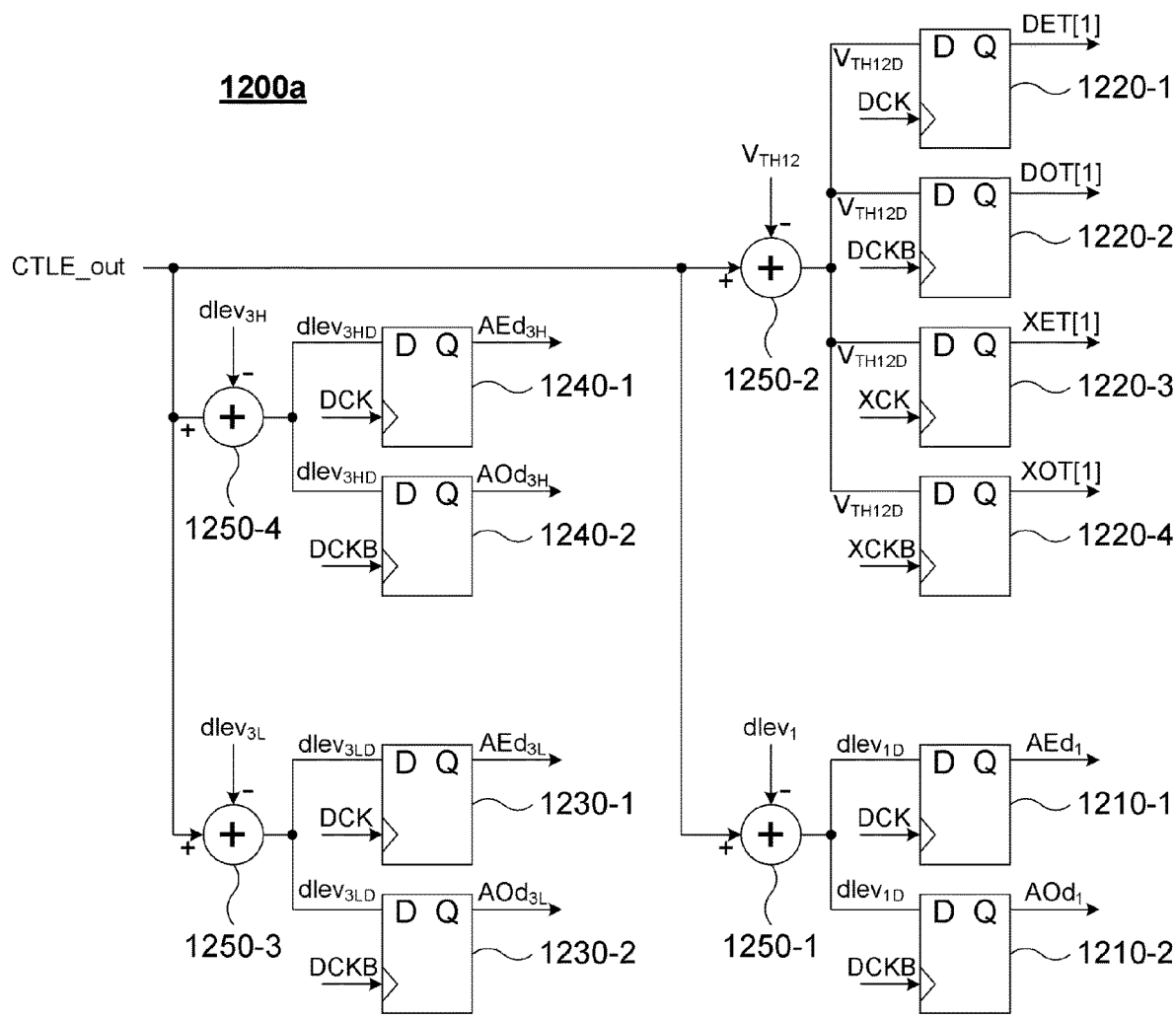
FIG. 9A through FIG. 9D are diagrams illustrating in detail the sampler of the PAM4 receiver shown in FIG. 7.

FIG. 9A is a block diagram illustrating a sampler used in a training mode of the PAM4 receiver according to the present invention.

Referring to FIG. 9A, a sampler 1200a for the training mode of the PAM4 receiver according to the present invention includes flip-flops 1210-1, 1210-2, 1220-1, 1220-2, 1220-3, 1220-4, 1230-1, 1230-2, 1240-1 and 1240-2 and adders 1250-1, 1250-2, 1250-3 and 1250-4.

The signal CTLE_out of the CTLE 1100 is inputted to the four adders 1250-1, 1250-2, 1250-3 and 1250-4, respectively, and the adder 1250-1 outputs a difference $dlev_{1D}$ between the signal CTLE_out and a data level $dlev_1$, the adder 1250-2 outputs a difference $V_{TH12D}$ between the signal CTLE_out and a threshold voltage $V_{TH12}$, the adder 1250-3 outputs a difference $dlev_{3LD}$ between the signal CTLE_out and a data level $dlev_{3L}$, and the adder 1250-4 outputs a difference $dlev_{3HD}$ between the signal CTLE_out and a data level $dlev_{3H}$.

The difference $dlev_{1D}$ between the signal CTLE_out and the data level $dlev_1$ is inputted to the flip-flops 1210-1 and 1210-2, and is sampled at the rising edges of the clock signals DCK and DCKB and outputted as signals $AEd_1$ and $AOd_1$ by the flip-flops 1210-1 and 1210-2, respectively. The difference $V_{TH12D}$ between the signal CTLE_out and the threshold voltage $V_{TH12}$ is inputted to the flip-flops 1220-1, 1220-2, 1220-3 and 1220-4, and is sampled at the rising edges of clock signals DCK, DCKB, XCK and XCKB and outputted as signals DET[1], DOT[1], XET[1] and XOT[1] by the flip-flops 1220-1, 1220-2, 1220-3 and 1220-4, respectively.

In addition, the difference $dlev_{3LD}$ between the signal CTLE_out and the data level $dlev_{3L}$ is inputted to the flip-flops 1230-1 and 1230-2, and is sampled at the rising edges of the clock signals DCK and DCKB and outputted as signals $AEd_{3L}$ and $AOd_{3L}$ by the flip-flops 1230-1 and 1230-2, respectively. The difference $dlev_{3HD}$ between the signal CTLE_out and the data level $dlev_{3H}$ is inputted to the flip-flops 1240-1 and 1240-2, is sampled at the rising edges of the clock signals DCK and DCKB and outputted as signals $AEd_{3H}$ and $AOd_{3H}$ by the flip-flops 1240-1 and 1240-2, respectively.

Here, the signals outputted by the flip-flops represent the sign of the signal inputted to the flip-flops. For example, when the value of the signal $AEd_{3H}$ obtained by sampling the difference $dlev_{3HD}$ is "1", it indicates that the difference $dlev_{3HD}$ is a positive number. In other words, it indicates that the voltage level of the signal CTLE_out is higher than that of the data level $dlev_{3H}$. Similarly, when the value of signal $AEd_{3H}$ is "0", it indicates that the difference $dlev_{3HD}$ is a negative number. That is, it indicates that the voltage level of the signal CTLE_out is smaller than that of the data level $dlev_{3H}$.

Figure 1A:
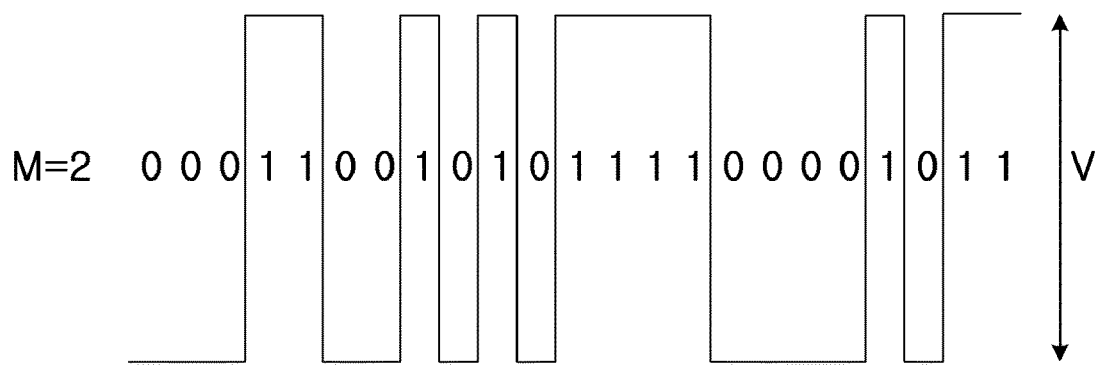
FIG. 1A through FIG. 1C are diagrams illustrating binary PAM (PAM2), and multi-level PAM (PAM4, PAM8) signals, respectively.
Figure 1B:
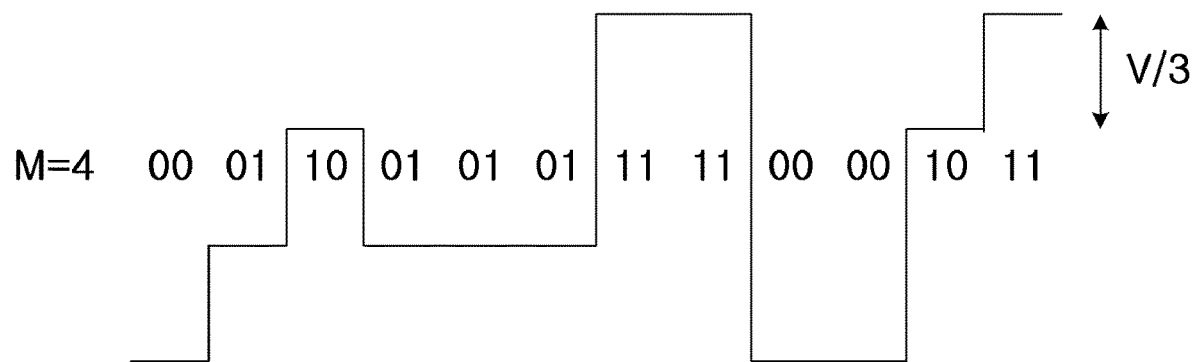
Figure 1C:
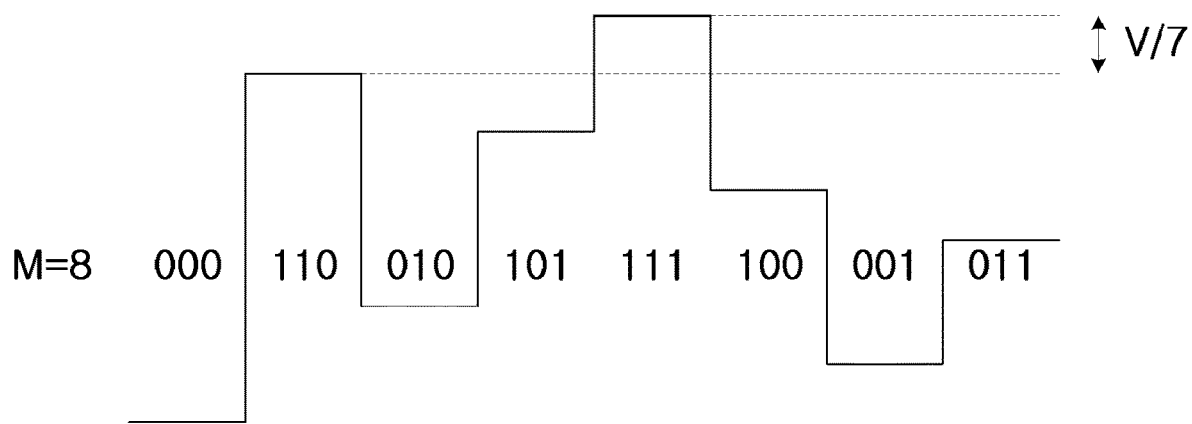
Figure 2:
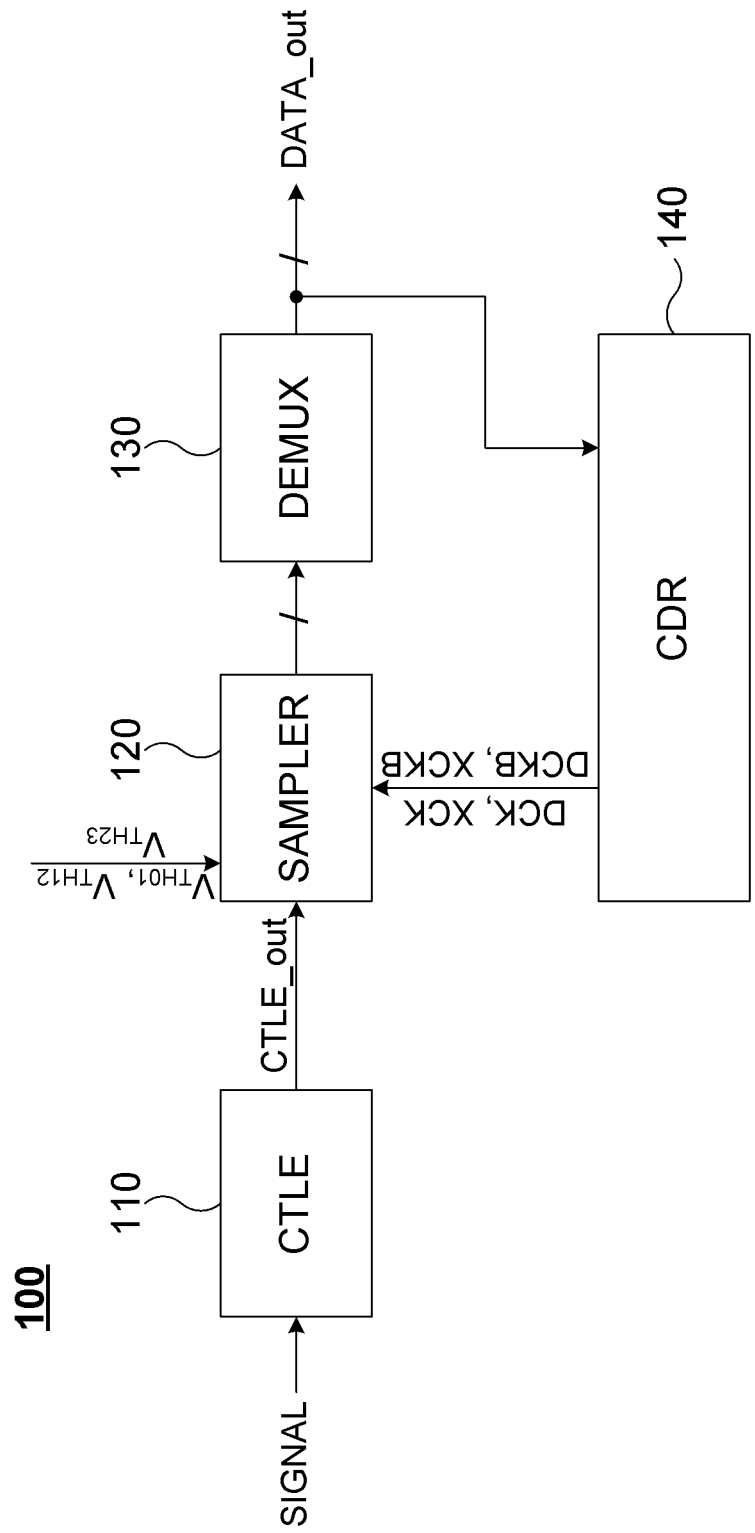
FIG. 2 is a block diagram illustrating a conventional PAM4 receiver.
Figure 3:
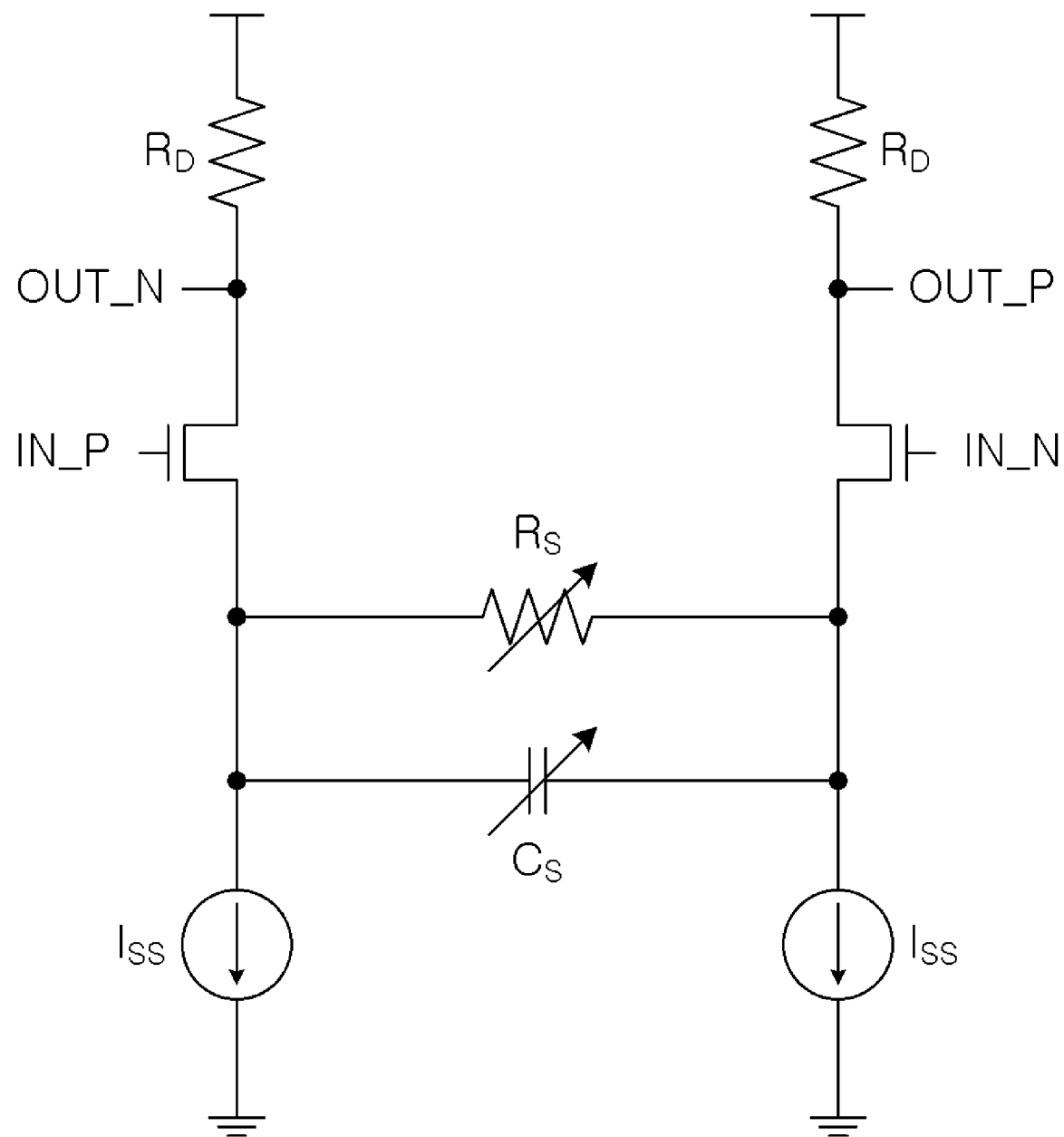
FIG. 3 is a circuit diagram illustrating, in detail, the CTLE 110 shown in FIG. 2.
Figure 4:
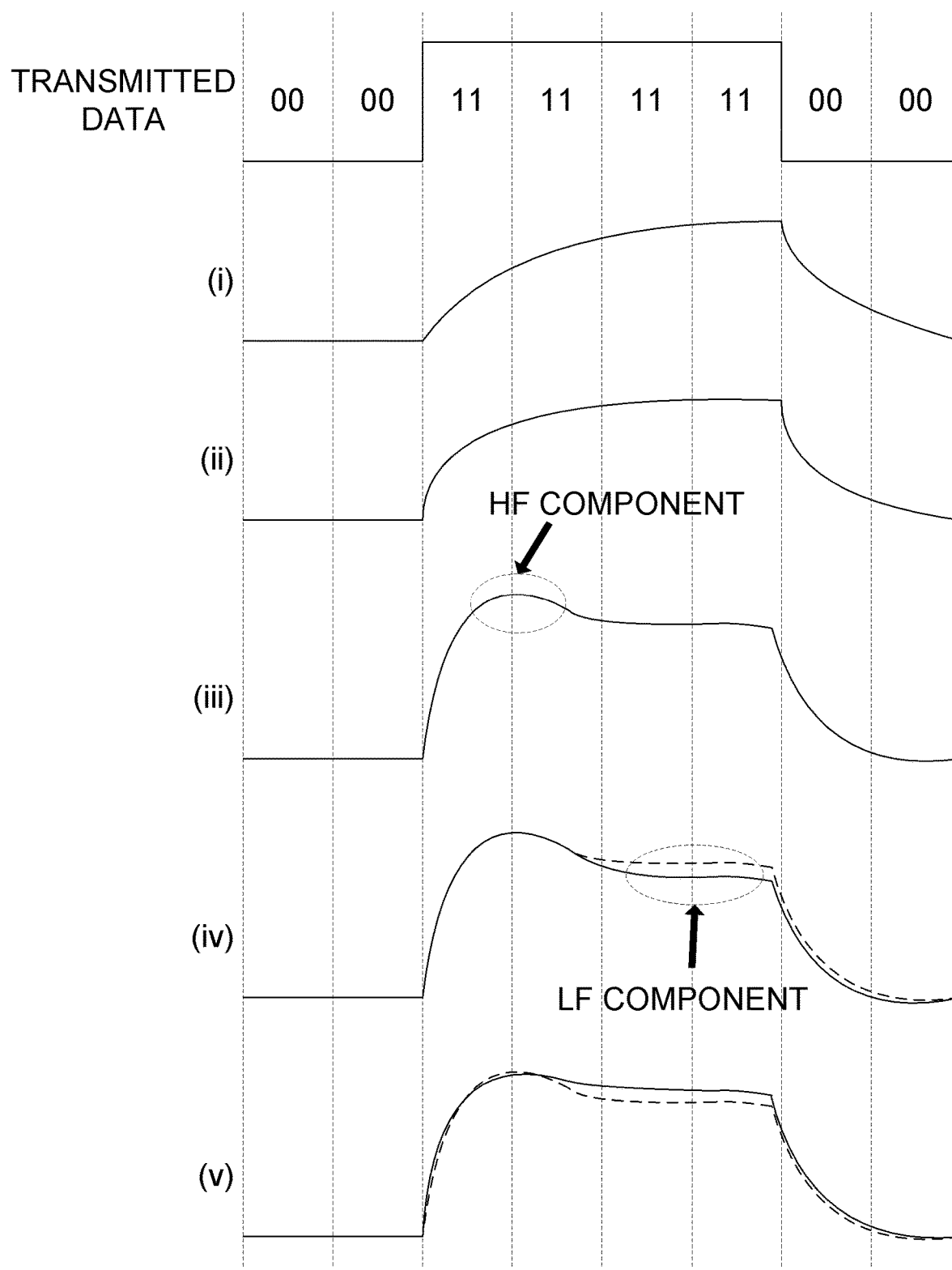
FIG. 4 is a diagram illustrating a waveform of a signal CTLE_out according to the capacitance of the capacitor $C_s$ and the resistance of the resistor $R_s$.
Figure 5:
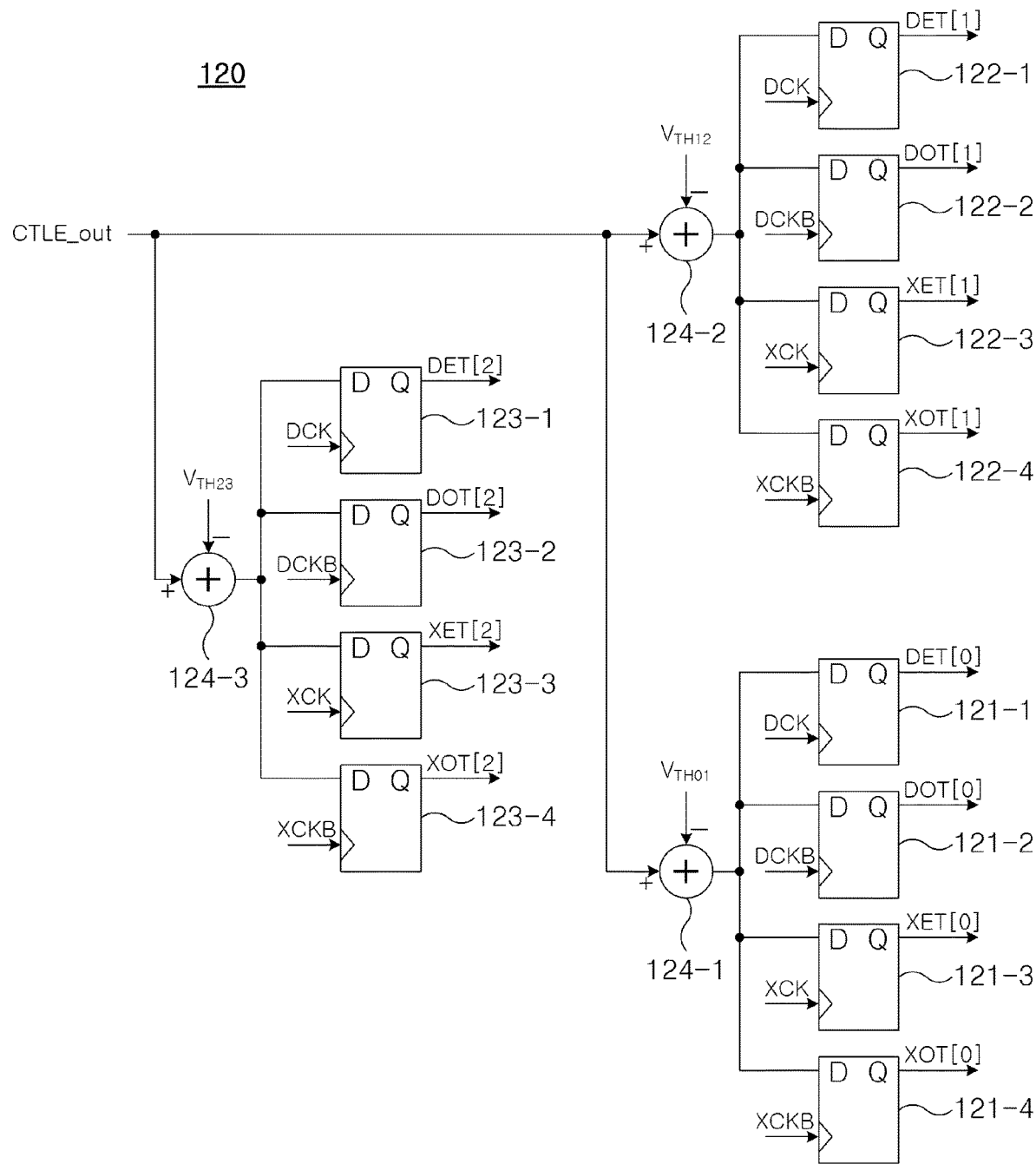
FIG. 5 is a block diagram illustrating a sampler used in a conventional PAM4 receiver.
Figure 9B:
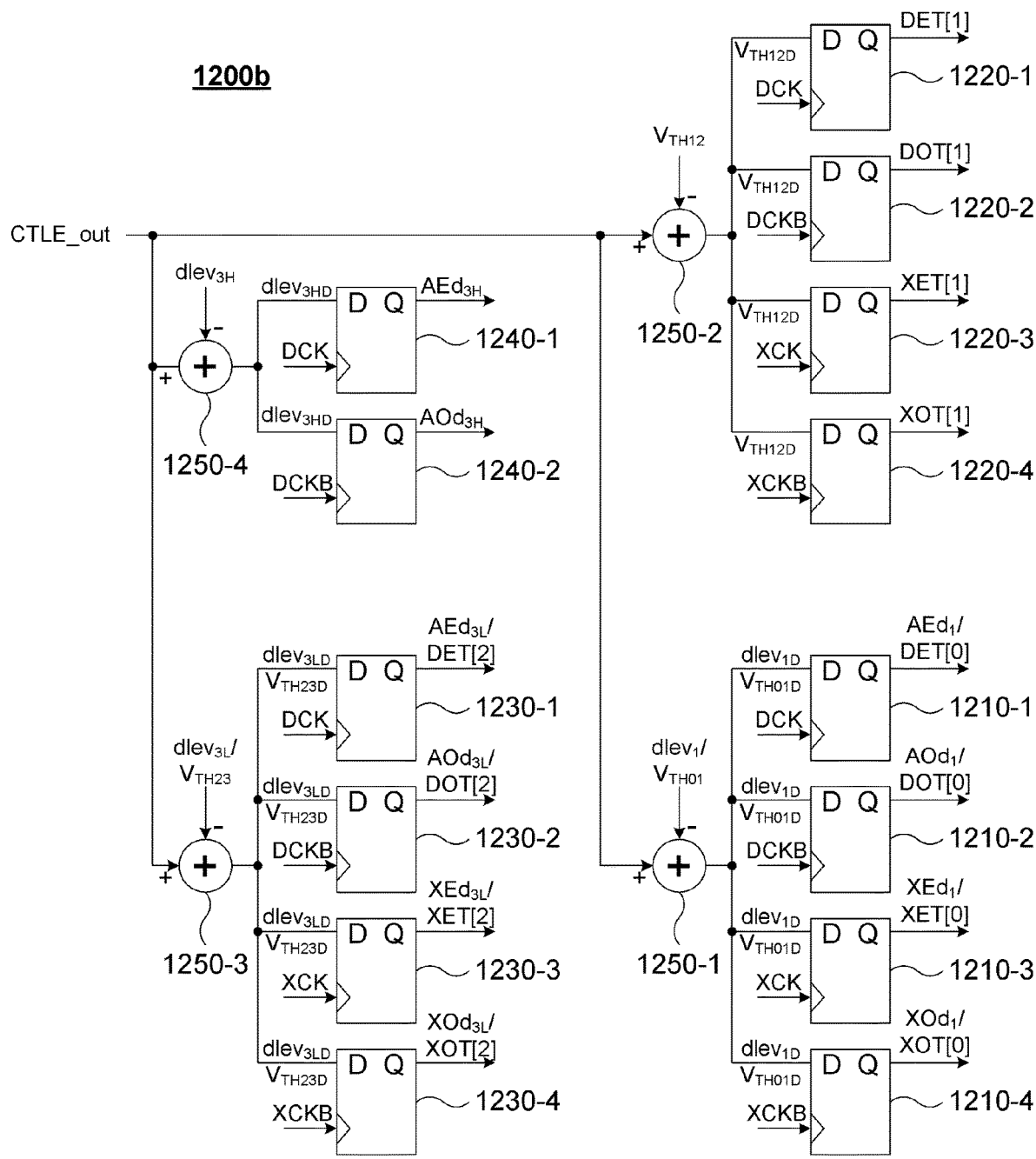

FIG. 9B is a block diagram illustrating a sampler which is a combination of the samplers shown in FIG. 9A and FIG. 5.

Referring to FIG. 9B, a sampler 1200b of the PAM4 receiver according to the present invention differs from the sampler 120 shown in FIG. 5 in that the sampler 1200b further includes the flip-flops 1240-1 and 1240-2 and the adder 1250-4 of the sampler 1200a shown in FIG. 9A added to the sampler 120 shown in FIG. 5.

Additional difference between the sampler 1200b shown in FIG. 9B and the sampler 120 shown in FIG. 5 is as follows.

First, the sampler 1200b differs from the sampler 120 shown in FIG. 5 in that, in the training mode, the adder 1250-1 outputs the difference $dlev_{1D}$ between the signal CTLE_out and the data level $dlev_1$, and the difference $dlev_{1D}$ is sampled at the rising edges of the clock signals DCK, DCKB, XCK and XCKB and outputted as the signals $AEd_1$, $AOd_1$, $XEd_1$ and $XOd_1$ by the flip-flops 1210-1, 1210-2, 1210-3 and 1210-4, respectively. In addition, the sampler 1200b differs from the sampler 120 shown in FIG. 5 in that, when the sampler 1200b is actually in use after exiting the training mode, the adder 1250-1 outputs the difference $V_{TH01D}$ between the signal CTLE_out and a threshold voltage $V_{TH01}$, and the difference $V_{TH01D}$ is sampled at the rising edges of clock signals DCK, DCKB, XCK and XCKB, and is outputted as the signals DET[0], DOT[0], XET[0] and XOT[0] by the flip-flops 1210-1, 1210-2, 1210-3 and 1210-4, respectively.

Similarly, the sampler 1200b differs from the sampler 120 shown in FIG. 5 in that the adder 1250-3 and the flip-flops 1230-1, 1230-2, 1230-3 and 1230-4, as well as the adder 1250-1 and the flip-flops 1210-1, 1210-2, 1210-3 and 1210-4, sample and output the corresponding signal.

Figure 9C:
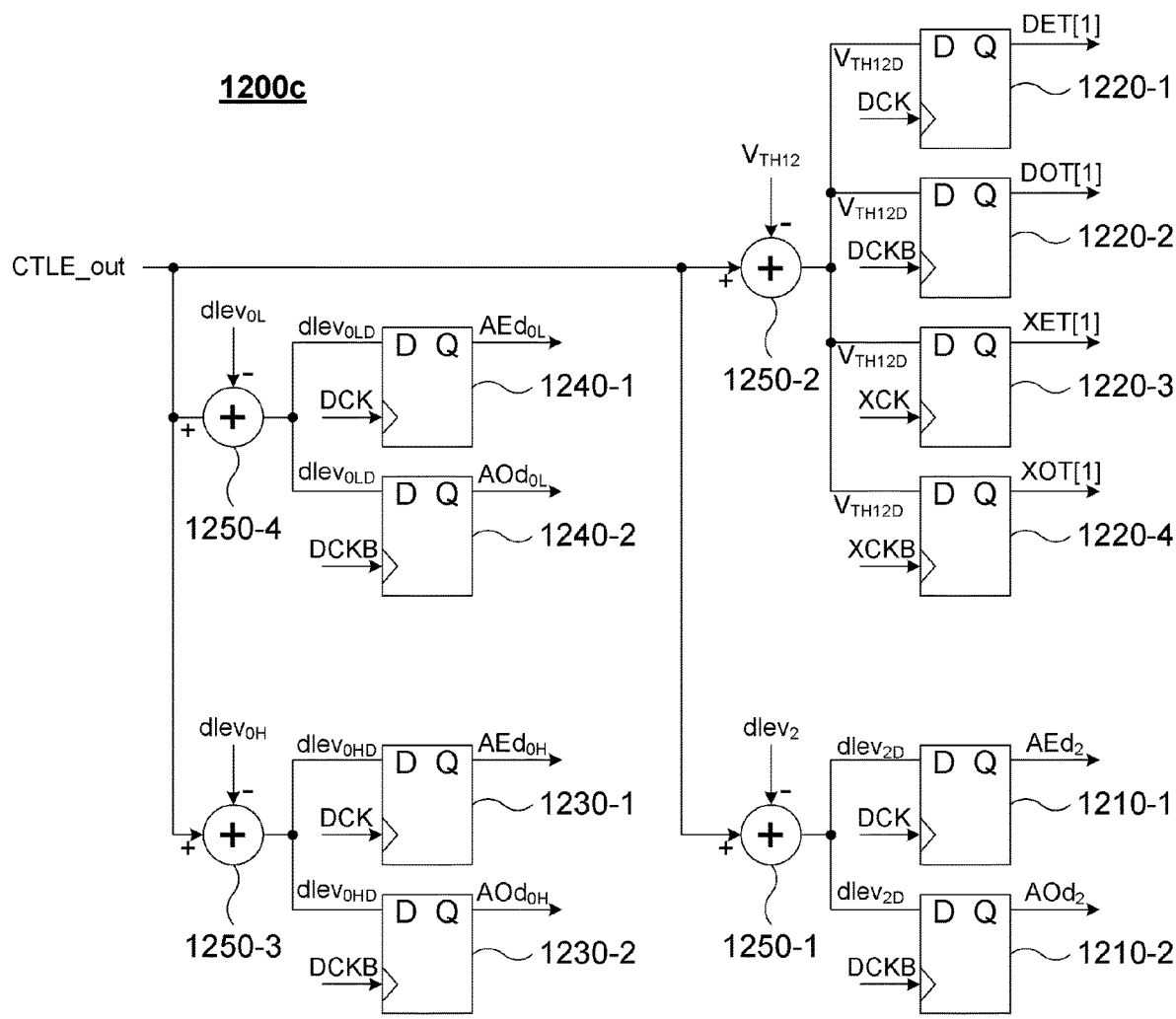

FIG. 9C is a block diagram illustrating another example of the sampler used in the training mode of the PAM4 receiver according to the present invention.

Referring to FIG. 9C, a sampler 1200c used in the training mode of the PAM4 receiver according to the present invention includes flip-flops 1210-1, 1210-2, 1220-1, 1220-2, 1220-3, 1220-4, 1230-1, 1230-2, 1240-1 and 1240-2 and adders 1250-1, 1250-2, 1250-3 and 1250-4.

The sampler 1200c shown in FIG. 9C has the same configuration as the sampler 1200a shown in FIG. 9A. However, the signals inputted to the sampler 1200c differ from those inputted to the sampler 1200a.

Specifically, the sampler 1200c differs from the sampler 1200a in that data level $dlev_2$ is inputted to the adder 1250-1 instead of the data level $dlev_1$, and data levels $dlev_{OH}$ and $dlev_{OL}$ are inputted to the adder 1250-3 and 1250-4 instead of data levels $dlev_{3L}$ and $dlev_{3H}$, respectively. However, the sampler 1200c is the same as the sampler 1200a in that the outputs of the adders 1250-1, 1250-3 and 1250-4 are sampled at the rising edge of the corresponding clock, and the sampled data are outputted.

Figure 9D:
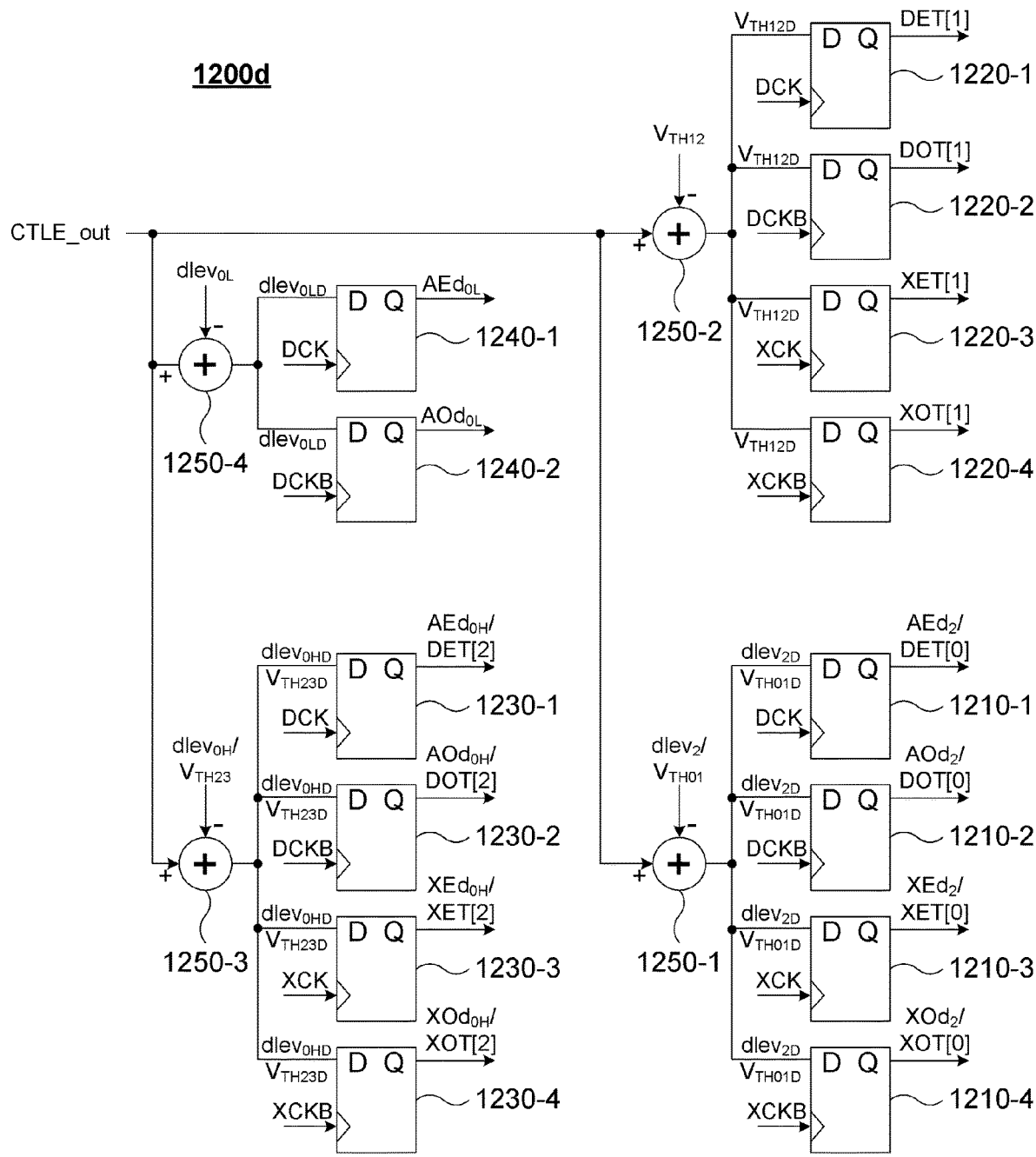

FIG. 9D is a block diagram illustrating a sampler which is a combination of the samplers shown in FIG. 9C and FIG. 5.

Referring to FIG. 9D, the sampler 1200d of the PAM4 receiver according to the present invention is the same as the sampler 1200b shown in FIG. 9B except the difference between the sampler 1200c shown in FIG. 9C and the sampler 1200a shown in FIG. 9A. Therefore, a detailed description thereof is omitted.

Referring back to FIG. 7, the DEMUX 1300 parallelizes the signal SAMPLE_out from the sampler 1200 and outputs the signal DATA_out.

Specifically, the DEMUX 1300 parallelizes, according to a predetermined clock, the signals DET[0], DOT[0], XET[0], XOT[0], DET[1], DOT[1], XET[1], XOT[1], DET[2], DOT[2], XET[2] and XOT[2] contained in the signal SAMPLE_out, and outputs the parallelized signals DET[2:0], DOT[2:0], XET[2:0] and XOT[2:0] as the signal DATA_out. More specifically, since the signals DET[0], DOT[0], XET[0], XOT[0], DET[1], DOT[1], XET[1], XOT[1], DET[2], DOT[2], XET[2] and XOT[2] contained in the signal SAMPLE_out are not simultaneously outputted, the signals DET[0], DOT[0], XET[0], XOT[0], DET[1], DOT[1], XET[1], XOT[1], DET[2], DOT[2], XET[2] and XOT[2] contained in the signal SAMPLE_out are parallelized (synchronized) according to a predetermined clock and outputted as the signal DATA_out. Similarly, the DEMUX 1300 may parallelize other signals outputted from the sampler 1200.

In addition, the DEMUX 1300 provides the signal DATA_out to the CDR 1400 and the controller 1500.

The CDR (Clock-and-Data Recovery) 1400 provides the sampling clock signals DCK, XCK, DCKB and XCKB to the sampler 1200 and the controller 1500.

Figure 6:
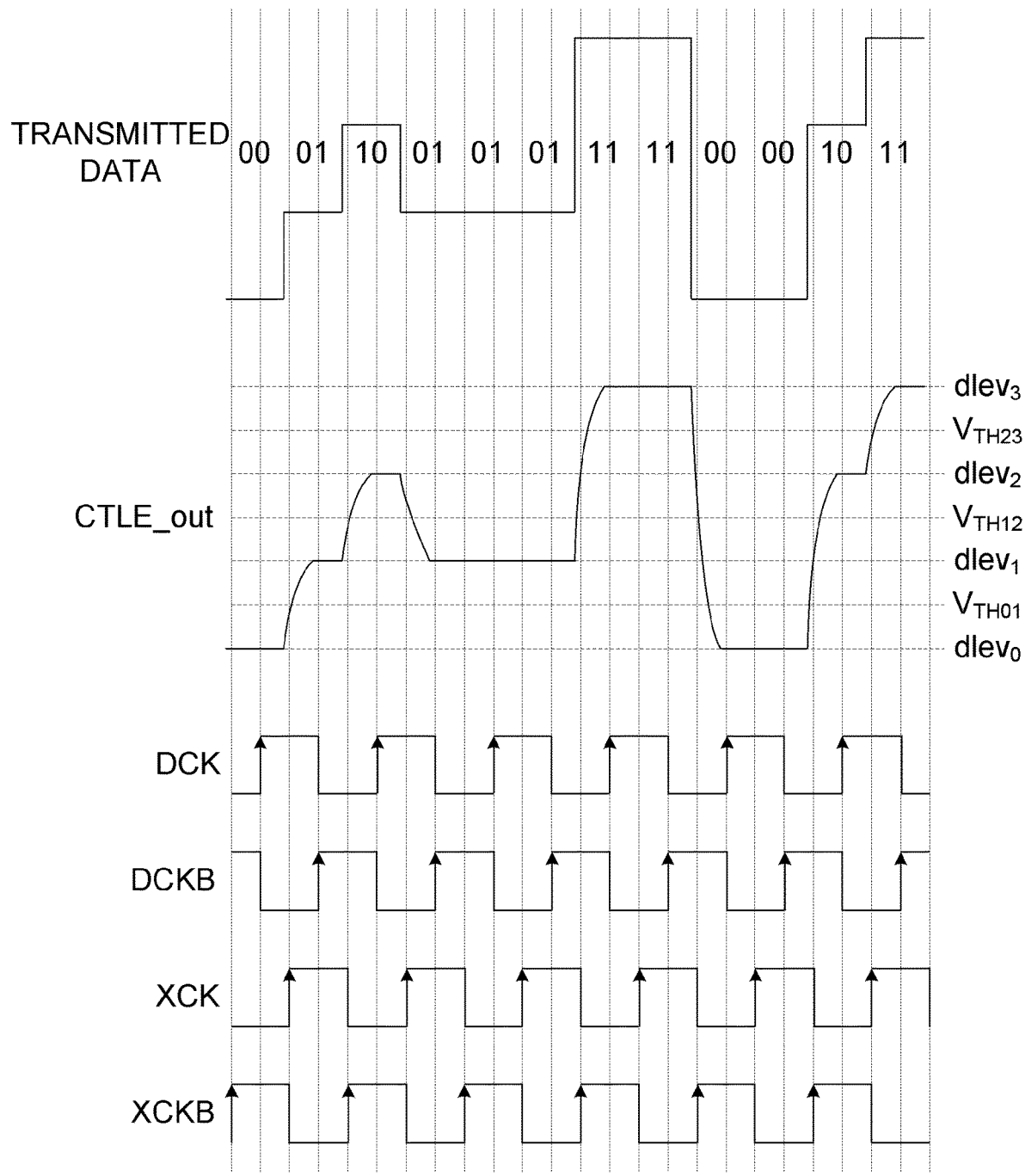
FIG. 6 is a waveform diagram illustrating signals in the conventional PAM4 receiver.

Specifically, the CDR 1400 adjusts the timings or the phases of the sampling clock signals DCK, XCK, DCKB and XCKB based on the signal DET[2:0], DOT[2:0], XET[2:0], XOT[2:0]. Here, the sampling clock signal DCK, XCK, DCKB and XCKB are the same as those shown in FIG. 6.

More specifically, the CDR 1400 adjusts the phases of the sampling clock signal DCK, XCK, DCKB and XCKB according to the time point at which the signal CTLE_out passes the threshold voltage $V_{TH12}$, that is, the time point at which a transition section of the signal CTLE_out and the threshold voltage $V_{TH12}$ meet. For example, since the transition section of signal CTLE_out is sampled according to the clock signals XCK and XCKB, CDR 1400 determines the time point at which the signal CTLE_out passes the threshold voltage $V_{TH12}$ at the rising edges of the clock signals XCK and XCKB, and adjusts the phases of the sampling clock signals DCK and DCKB such that the signal CTLE_out is sampled at the center of the symbol according to the clock signals DCK and DCKB.

The controller 1500 feeds a threshold voltage $V_{TH01}$, $V_{TH12}$, $V_{TH23}$ and the data levels $dlev_3H$, $dlev_{3L}$, $dlev_1$ and $dlev_2$ to the sampler 1200, and generates signals EQ_AC $[N_{AC}-1:0]$ and EQ_DC$[N_{DC}-1:0]$ for selectively turning on or off a plurality of capacitors $C_{unit}$ and a plurality of resistors $R_{unit}$ included in the CTLE 1100, respectively in order to control high frequency amplification characteristics and low frequency amplification characteristics of the CTLE 1100.

Hereinafter, a method of training a PAM4 receiver according to the present invention will be described in detail.

The PAM4 receiver according to the present invention receives actual data after being tuned or trained by a training pattern. Specifically, the PAM4 receiver is used for actual communication after various parameters such as the threshold voltages $V_{TH01}$, $V_{TH12}$ and $V_{TH23}$ are tuned using the training pattern.

The training pattern was created considering DC balance, timing of transitions, and facilitation of data level measurement. For DC balance, it is desirable to create the training pattern including combinations of "00" and "11" wherein the number of "00" and "11" are the same, and the number of "01" and "10" are the same. For the timing of the transition, it is desirable to select data in the training pattern such that the signal CTLE_out passes the threshold voltage $V_{TH12}$ only when the transitions "00"→"11", "11"→"00", "01"→"10" and "10"→"01" occur. For facilitation of data level measurement, it is desirable to select data in the training pattern such that the number of each of "00", "01", "10" and "11" is equal to or more than two.

Figure 10A:
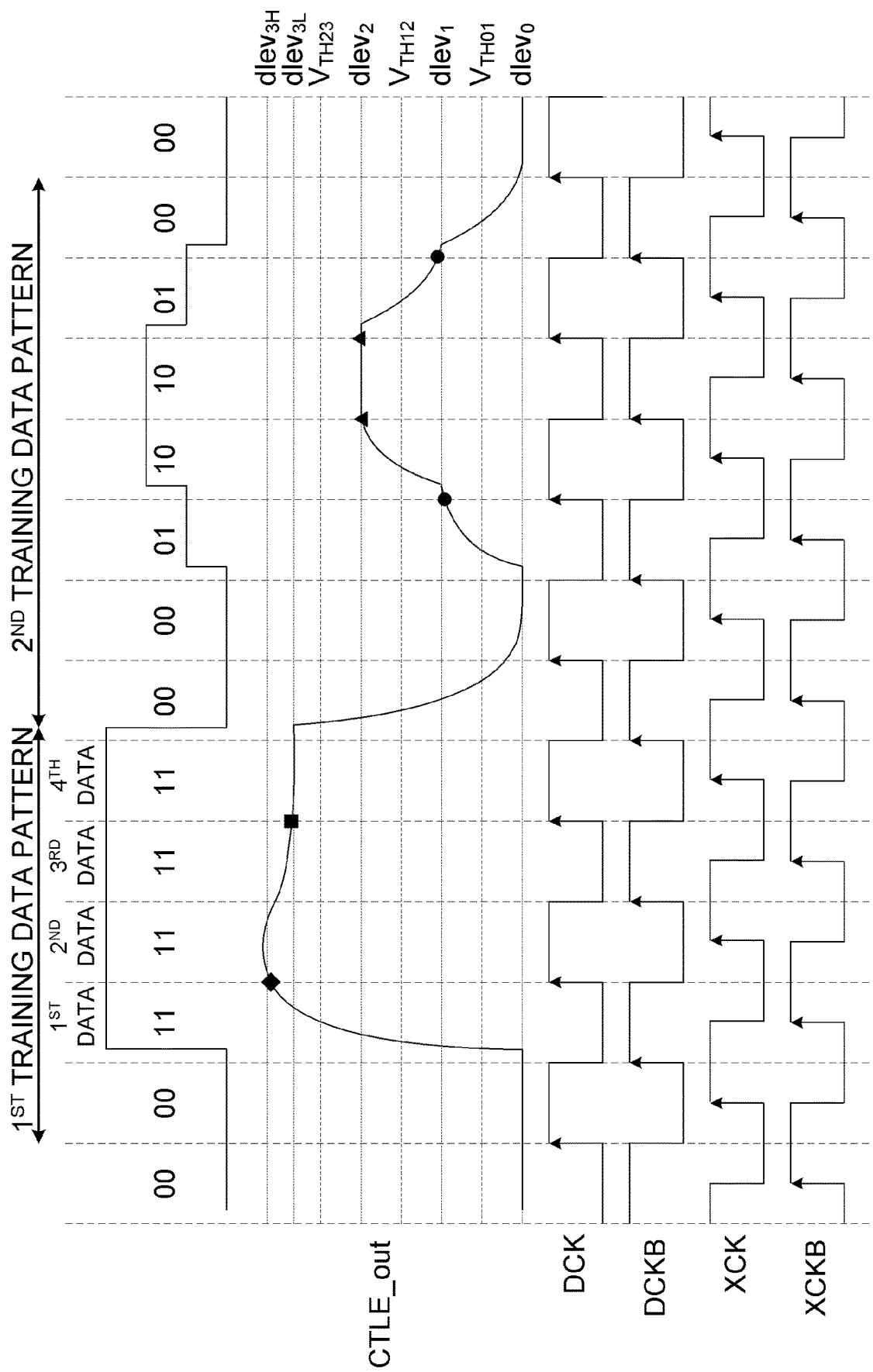
FIG. 10A and FIG. 10B are waveform diagrams for describing the operation of the PAM4 receivers according to first and second embodiments of the present invention, respectively.
Figure 10B:
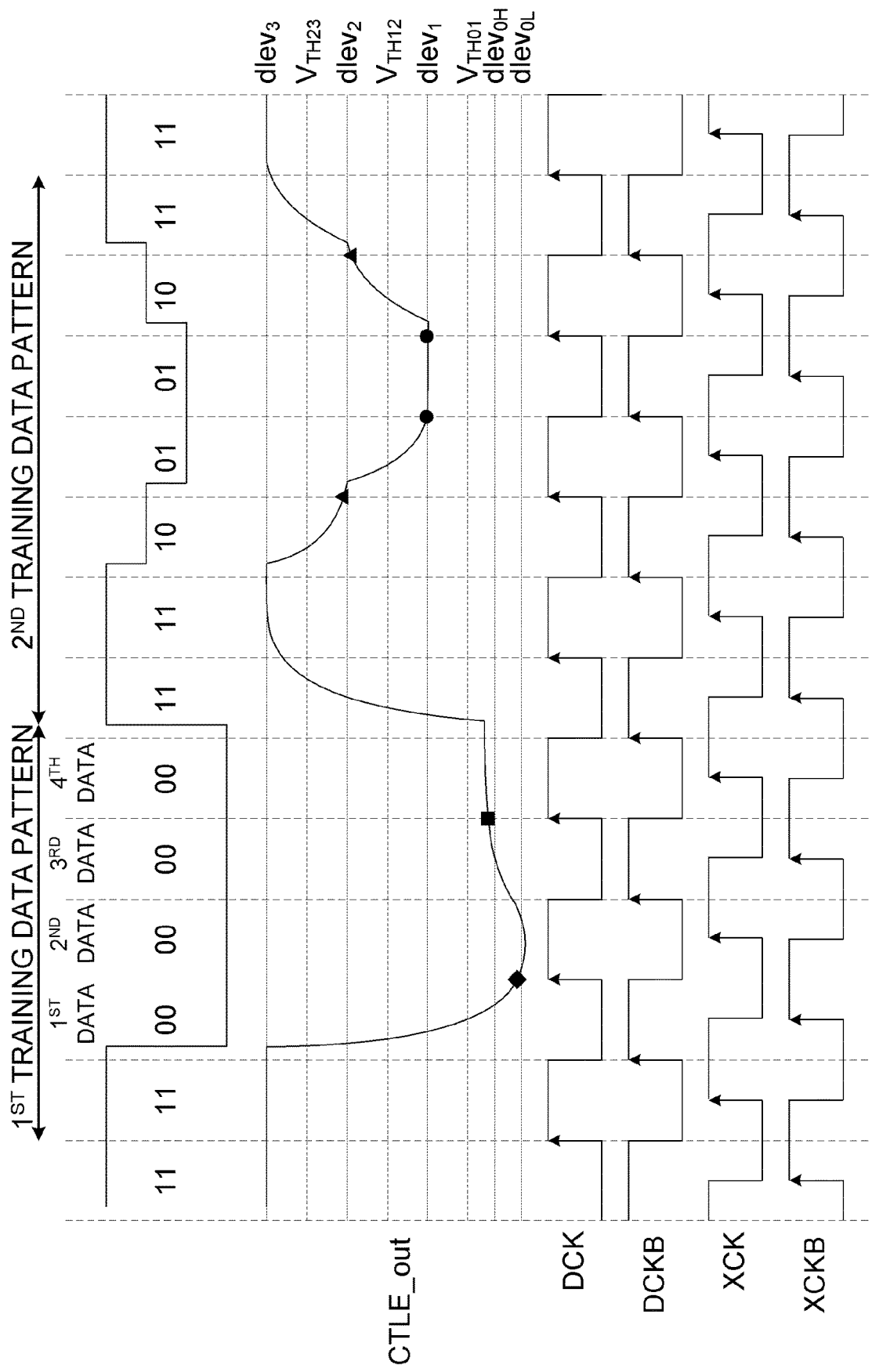

FIG. 10A and FIG. 10B are waveform diagrams of for describing the operation of the PAM4 receivers according to first and second embodiments of the present invention, respectively, wherein training patterns are shown.

The training pattern illustrated in FIG. 10A includes a first training data pattern and a second training data pattern. The training pattern includes four counts of data "00" and four counts of data "11", and two counts of data "01" and two counts of data "10" in overall. Specifically, the first training data pattern includes one data "00" and consecutive first data "11" through fourth data "11" in order, and the second training data pattern includes combinations of "00" and "11" having two counts of data "00", one count of data "01", two counts of data "10", one count of data "01" and two counts of data "00". However, as described above, different combinations of "00", "01", "10" and "11" are possible by considering DC balance, timing of transitions, and ease of data level measurement. For example, the first training data pattern may include consecutive first data "11" through $m^{th}$ data "11" in order where m is a natural number equal to or greater than 2.

The training pattern illustrated in FIG. 10B includes a first training data pattern and a second training data pattern. The training pattern includes four counts of data "00" and four counts of data "11", and two counts of data "01" and two counts of data "10" in overall. Specifically, the first training data pattern includes one data "11" and consecutive first data "00" to fourth data "00" in order, and the second training data pattern includes combinations of "00" and "11" having two counts of data "11", one count of data "10", two counts of data "01", one count of data "10" and two counts of data "11". However, as described above, different combinations of "00", "01", "10" and "11" are possible by considering DC balance, timing of transitions, and ease of data level measurement. For example, the first training data pattern may include consecutive first data "00" through $m^{th}$ data "00" in order where m is a natural number equal to or greater than 2.

Hereinafter, the method of training the PAM4 receiver according to the first embodiment and the second embodiment of the present invention will be described in detail with reference to FIGS. 10A, 10B, 11A and 11B.

Figure 11A:
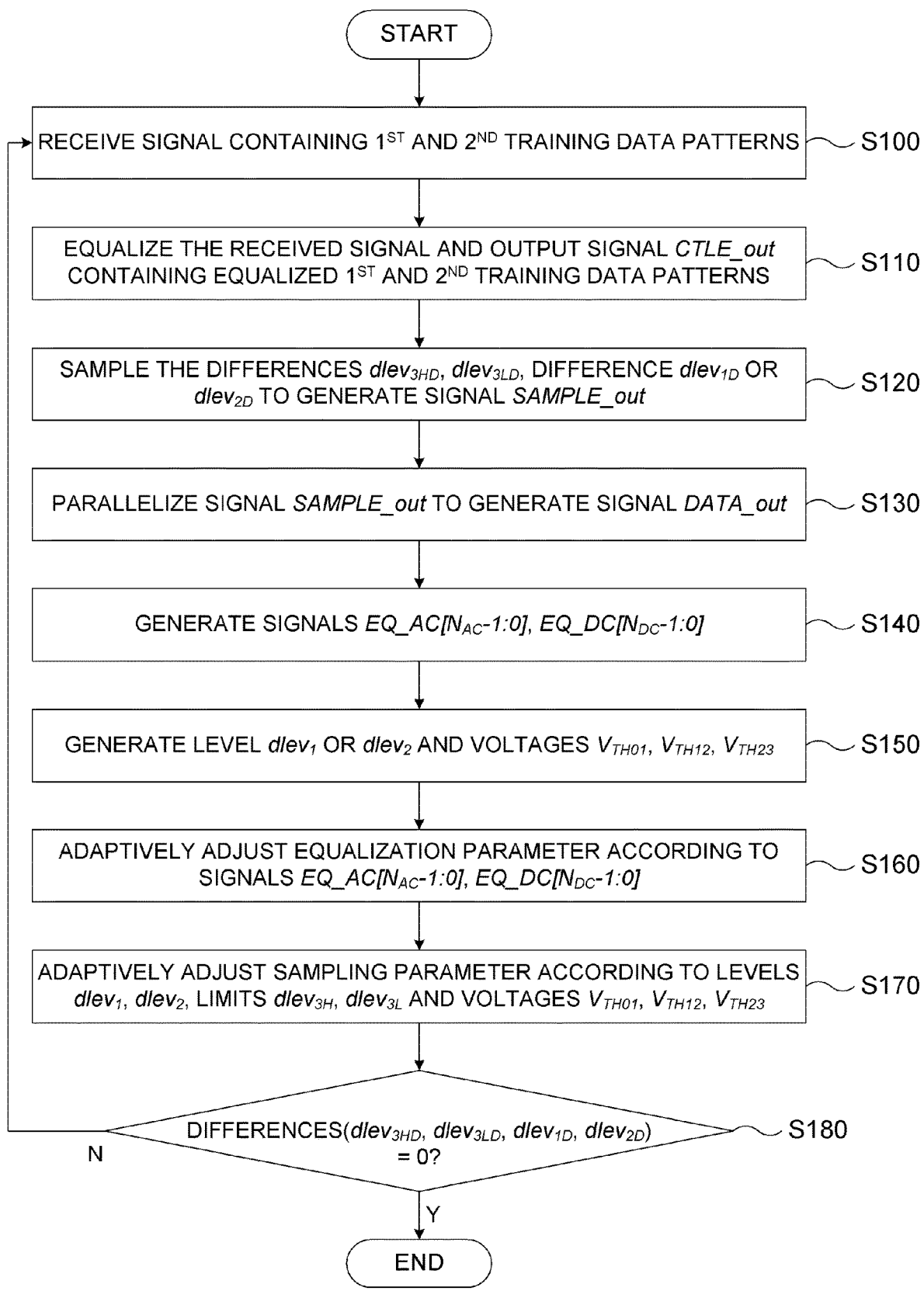
FIG. 11A and FIG. 11B are flow diagrams illustrating methods of training the PAM4 receivers according to the first and the second embodiments of the present invention, respectively.

FIG. 11A is a flow diagrams illustrating a method of training the PAM4 receivers according to the first embodiment of the present invention. It is preferable to use the sampler shown in FIG. 9A when training the PAM4 receiver according to the present invention using the training pattern exemplified in FIG. 10A. However, the present invention is not limited thereto.

First, for convenience of describing the present invention, equations $$V_{TH01} = \frac{dlev_0 + dlev_1}{2} \quad V_{TH12} = \frac{dlev_1 + dlev_2}{2}, \text{ and}$$

$$V_{TH23} = \frac{dlev_2 + dlev_3}{2}$$

are assumed. That is, the threshold voltages $V_{TH01}$, $V_{TH12}$ and $V_{TH23}$ are calculated by the controller 1500 according to the equations and provided to the sampler 1200. In addition, predetermined initial values of the data levels $dlev_{3H}$ and $dlev_{3L}$ are stored in the controller 1500 in advance, and equation $$dlev_3 = \frac{dlev_{3H} + dlev_{3L}}{2}$$

is assumed.

Referring to FIG. 11A, the CTLE 1100 of the PAM4 receiver according to the present invention receives a signal containing the training pattern shown in FIG. 10A (S100). Specifically, the CTLE 1100 shown in FIG. 7 receives the training pattern including the first training data pattern and the second training data pattern.

Thereafter, the CTLE 1100 equalizes the signal received in the step S100 based on the initial equalization parameter, and outputs the signal CTLE_out shown in FIG. 10A (S110). Here, the equalization parameter includes a high frequency amplification gain and a low frequency amplification gain of a linear equalizer.

Specifically, CTLE 1100 equalizes the received signal containing the training pattern according to the initial equalization parameter, and outputs the signal CTLE_out containing equalized first training data pattern and equalized second training data pattern.

Thereafter, the sampler 1200a samples the signal CTLE_out at the rising edge of the clock signals DCK and DCKB to generate a signal SAMPLE_out (S120).

Specifically, The sampler 1200a shown in FIG. 9A samples the difference $dlev_{3HD}$ which is a difference between: the voltage level of the signal CTLE_out immediately after the transition from the data "00" to the first data "11" of the first training data pattern (i.e. a first voltage level of the signal CTLE_out (denoted by ♦ in FIG. 10A) corresponding to the first data "11" of the equalized first training data pattern when a transition from the data "00" to the first data "11" occurs); and a predetermined upper limit $dlev_{3H}$. The sampled difference $dlev_{3HD}$ is then outputted as the signal SAMPLE_out by the sampler 1200a.

Here, the difference $dlev_{3HD}$ is sampled by the flip-flops 1240-1 and 1240-2 shown in FIG. 9A at the rising edges of the clock signals DCK and DCKB, respectively, and outputted as signals $AEd_{3H}$ and $AOd_{3H}$, respectively. Each of the signals $AEd_{3H}$ and $AOd_{3H}$ may have value of "1" or "0" (representing whether the difference $dlev_{3HD}$ is a positive number or a negative number) depending on the first voltage level (magnitude) of the signal CTLE_out.

In addition, the sampler 1200a shown in FIG. 9A samples the difference $dlev_{3LD}$ which is a difference between: a second voltage level of the signal CTLE_out (denoted by □ in FIG. 10A) corresponding to one of the data after the first data "11" of the first training data pattern (i.e. any one of the second data "11" through the min data "11" of the equalized first training data pattern, where m is a natural number equal to or greater than 2, and an example wherein m=4 is shown in FIG. 10A); and a predetermined lower limit $dlev_{3L}$. The sampled difference $dlev_{3LD}$ is then outputted as the signal SAMPLE_out by the sampler 1200a.

Here, the difference $dlev_{3LD}$ is sampled by the flip-flops 1230-1 and 1230-2 shown in FIG. 9A at the rising edges of the clock signals DCK and DCKB, respectively, and outputted as signals $AEd_{3L}$ and $AOd_{3L}$, respectively. Each of the signals $AEd_{3L}$ and $AOd_{3L}$ may have value of "1" or "0" (representing whether the difference $dlev_{3LD}$ is a positive number or a negative number) depending on the voltage level (magnitude) of the signal CTLE_out.

Thereafter, the signal SAMPLE_out outputted by the sampler 1200a is parallelized and the parallelized signal SAMPLE_out is outputted as the signal DATA_out (S130). Specifically, the DEMUX 1300 generates the signal DATA_out by parallelizing the signal SAMPLE_out. Here, since the signal DATA_out is obtained by parallelizing signal SAMPLE_out, the signal DATA_out contains the signals included in the signal SAMPLE_out of the sampler 1200 such as the differences $dlev_{3HD}$ and $dlev_{3LD}$.

Thereafter, the signals $EQ\_AC[N_{AC}-1:0]$ and $EQ\_DC[N_{DC}-1:0]$ for adjusting the high and the low frequency amplification gains of the CTLE 1100, respectively, are generated from the signal DATA_out (S140).

Specifically, the signals $EQ\_AC[N_{AC}-1:0]$ and $EQ\_DC[N_{DC}-1:0]$ are generated based on the first training data pattern which is used for adjusting the high and the low frequency amplification gains of the CTLE 1100.

Hereinafter, a method of generating the signal $EQ\_AC[N_{AC}-1:0]$ will be described in detail, and a method of generating the signal $EQ\_DC[N_{DC}-1:0]$ will be described in detail thereafter.

The signal $EQ\_AC[N_{AC}-1:0]$ is generated based on the difference $dlev_{3HD}$ contained in the signal DATA_out.

Specifically, as described above, the difference $dlev_{3HD}$ is the difference between: the first voltage level of the signal CTLE_out (denoted by ♦ in FIG. 10A); and the upper limit $dlev_{3H}$. The reason for generating the signal $EQ\_AC[N_{AC}-1:0]$ and using the same to adjust the high frequency amplification gain of CTLE 1100 is to make the first voltage level of the signal CTLE_out equal to the upper limit $dlev_{3H}$.

In the case of the example shown in FIG. 10A, the difference $dlev_{3HD}$ has a negative value since the first voltage level of the signal CTLE_out is lower than the upper limit $dlev_{3H}$.

As a result, the first voltage level of the signal CTLE_out should be increased in the example shown in FIG. 10A since the goal is to make the first voltage level of the signal CTLE_out equal to the upper limit $dlev_{3H}$.

However, when the transition from the data "00" to the first data "11" of the first training data pattern occurs, the first voltage level of the signal CTLE_out corresponding to the first data "11" varies depending on the high frequency amplification gain of CTLE 1100. Therefore, in order to increase the first voltage level of the signal CTLE_out, the controller 1500 generates the signal $EQ\_AC[N_{AC}-1:0]$ that increases the high frequency amplification gain of the CTLE 1100 and provides the same to the CTLE 1100. For example, the controller 1500 generates the signal $EQ\_AC[N_{AC}-1:0]$ with increased number of value "1" contained therein and provides the same to the CTLE 1100 such that the number of capacitors $C_{unit}$ turned on by the signal $EQ\_AC[N_{AC}-1:0]$ increases.

On the other hand, when the first voltage level of the signal CTLE_out is higher than the upper limit $dlev_{3H}$, the difference $dlev_{3HD}$ has a positive value.

Similarly, the first voltage level of the signal CTLE_out should be decreased since the goal is to make the first voltage level of the signal CTLE_out equal to the upper limit $dlev_{3H}$, However, when the transition from the data "00" to the first data "11" of the first training data pattern occurs, the first voltage level of the signal CTLE_out corresponding to the first data "11" varies depending on the high frequency amplification gain of CTLE 1100. Therefore, in order to decrease the first voltage level of the signal CTLE_out, the controller 1500 generates the signal $EQ\_AC[N_{AC}-1:0]$ that decreases the high frequency amplification gain of the CTLE 1100 and provides the same to the CTLE 1100. For example, the controller 1500 the signal $EQ\_AC[N_{AC}-1:0]$ with increased number of value "0" contained therein and provides the same to the CTLE 1100 such that the number of capacitors $C_{unit}$ turned on by the signal $EQ\_AC[N_{AC}-1:0]$ decreases.

The signal EQ_DC[$N_{DC}$−1:0] is generated based on the difference dlev$_{3LD}$ contained in the signal DATA_out.

Specifically, as described above, the difference dlev$_{3LD}$ is the difference between: the second voltage level of the signal CTLE_out (denoted by □ in FIG. 10A); and the lower limit dlev$_{3L}$. The reason for generating the signal EQ_DC[$N_{DC}$−1:0] and using the same to adjust the low frequency amplification gain of CTLE 1100 is to make the second voltage level of the signal CTLE_out equal to the lower limit dlev$_{3L}$.

In the case of the example shown in FIG. 10A, the difference dlev$_{3LD}$ has a positive value since the second voltage level of the signal CTLE_out is higher than the lower limit dlev$_{3L}$.

As a result, the second voltage level of the signal CTLE_out should be decreased in the example shown in FIG. 10A since the goal is to make the second voltage level of the signal CTLE_out equal to the lower limit dlev$_{3L}$.

However, the second voltage level of the signal CTLE_out corresponding to any one of the second data "11" through the min data "11" of the equalized first training data pattern varies depending on the low frequency amplification gain of CTLE 1100. Therefore, in order to decrease the second voltage level of the signal CTLE_out, the controller 1500 generates the signal EQ_DC[$N_{DC}$−1:0] that decreases the low frequency amplification gain of the CTLE 1100 and provides the same to the CTLE 1100. For example, the controller 1500 generates the signal EQ_DC[$N_{DC}$−1:0] with increased number of value "0" contained therein and provides the same to the CTLE 1100 such that the number of resistors $R_{unit}$ turned on by the signal EQ_DC[$N_{DC}$−1:0] decreases.

On the other hand, when the second voltage level of the signal CTLE_out is lower than the lower limit dlev$_{3L}$, the difference dlev$_{3LD}$ has a negative value.

Similarly, the second voltage level of the signal CTLE_out should be increased since the goal is to make the second voltage level of the signal CTLE_out equal to the lower limit dlev$_{3L}$, However, the second voltage level of the signal CTLE_out corresponding to any one of the second data "11" through the m$^{th}$ data "11" of the equalized first training data pattern varies depending on the low frequency amplification gain of CTLE 1100. Therefore, in order to increase the second voltage level of the signal CTLE_out, the controller 1500 generates the signal EQ_DC[$N_{DC}$−1:0] that increases the low frequency amplification gain of the CTLE 1100 and provides the same to the CTLE 1100. For example, the controller 1500 generates the signal EQ_DC[$N_{DC}$−1:0] with increased number of value "1" contained therein and provides the same to the CTLE 1100 such that the number of resistors $R_u$, turned on by the signal EQ_DC[$N_{DC}$−1:0] increases.

Thereafter, the threshold voltages $V_{TH01}$, $V_{TH12}$ and $V_{TH23}$ of the sampler 1200a (or the sampler 1200b) are generated from the data level dlev$_1$ or dlev$_2$ (S150).

Specifically, the data level dlev$_1$ or dlev$_2$ is generated from the difference dlev$_{1D}$ or dlev$_{2D}$, respectively, and the threshold voltages $V_{TH01}$, $V_{TH12}$ and $V_{TH23}$ of the sampler 1200a (or the sampler 1200b) are generated from the upper limit dlev$_{3H}$, the lower limit dlev$_{3L}$ and the data levels dlev$_0$, dlev$_1$, dlev$_2$ and dlev$_3$.

Figure 12A:
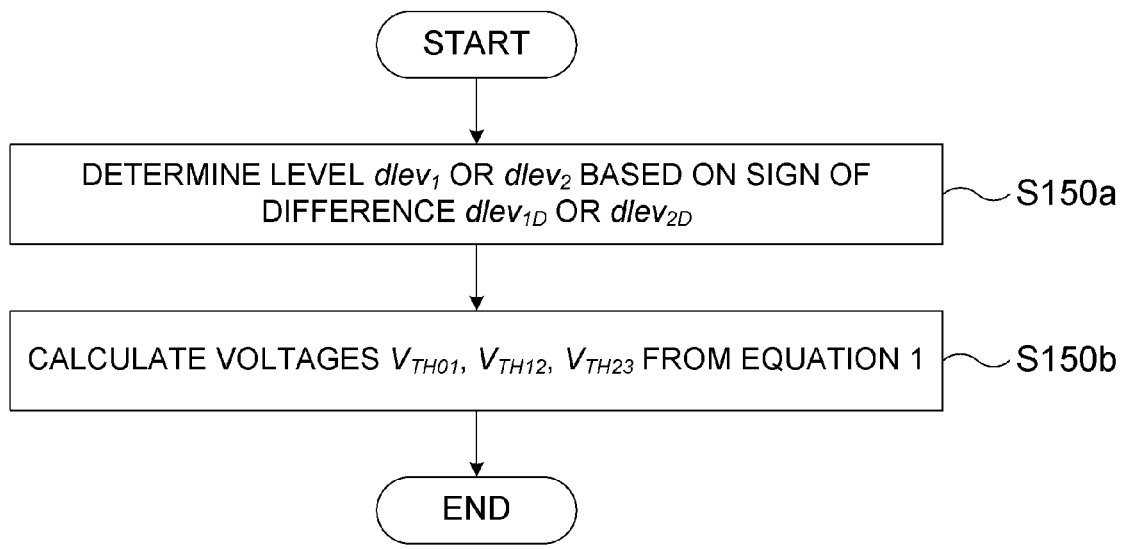
FIG. 12A and FIG. 12B are flow diagrams illustrating, in detail, step S150 and step S250 shown in FIG. 11A and FIG. 11B, respectively.

The step S150 includes a step S150a and a step S150b shown in FIG. 12A. Hereinafter, the step S150 will be described in detail with reference to FIG. 12A.

Referring to FIG. 12A, the data levels dlev$_1$ and dlev$_2$ are determined according to the signs of the differences dlev$_{1D}$ and dlev$_{2D}$, respectively (S150a).

Specifically, the data levels dlev$_1$ and dlev$_2$ are determined using the second training data pattern.

As shown in FIG. 9A, the sampler 1200a samples the difference dlev$_{1D}$ which is a difference between: a third voltage level (denoted by ● in FIG. 10A) of the signal CTLE_out corresponding to the data "01" of the second training data pattern at the rising edge of the clock signals DCK and DCKB; and the data level dlev$_1$. Here, the data level dlev$_1$ has an initial value, and the controller 1500 then adjusts the data level dlev$_1$ according to the sign of the difference dlev$_{1D}$. That is, depending on which one of the third voltage level of the signal CTLE_out and the data level dlev$_1$ is higher, the data level dlev$_1$ is increased or decreased by a predetermined value.

While the sampler 1200a samples the difference dlev$_{1D}$ in FIG. 9A, the difference dlev$_{2D}$, which is a difference between: a fourth voltage level (denoted by ▲ in FIG. 10A) of the signal CTLE_out corresponding to the data "10" of the second training data pattern at the rising edge of the clock signals DCK and DCKB; and the data level dlev$_2$, may also be sampled. In particular, when the data levels dlev$_1$ and dlev$_2$ have the same magnitude and opposite signs (i.e., dlev$_2$=−dlev$_1$), it is sufficient when only one of the data levels dlev$_1$ and dlev$_2$ is determined since the other can be automatically determined. However, when the data levels dlev$_1$ and dlev$_2$ have different magnitudes or have the same sign, both of the differences dlev$_{1D}$ and dlev$_{2D}$ may be sampled to adjust both of the data levels dlev$_1$ and dlev$_2$.

Thereafter, the threshold voltages $V_{TH01}$, $V_{TH12}$ and $V_{TH23}$ of the sampler 1200a (or the sampler 1200b) are calculated from the upper limit dlev$_{3H}$, the lower limit dlev$_{3L}$ and the data levels dlev$_0$, dlev$_1$, dlev$_2$ and dlev$_3$ according to the equation 1 below (S150b).

$$dlev_3 = \frac{dlev_{3H} + dlev_{3L}}{2}, V_{TH01} = \frac{dlev_0 + dlev_1}{2},$$
$$V_{TH12} = \frac{dlev_1 + dlev_2}{2}, V_{TH23} = \frac{dlev_2 + dlev_3}{2}$$ [Equation 1]

Thereafter, as shown in FIG. 11A, the equalization parameter is adaptively adjusted according to the signals EQ_AC[$N_{AC}$−1:0] and EQ_DC[$N_{DC}$−1:0] generated in the step S140 (S160).

Figure 13A:
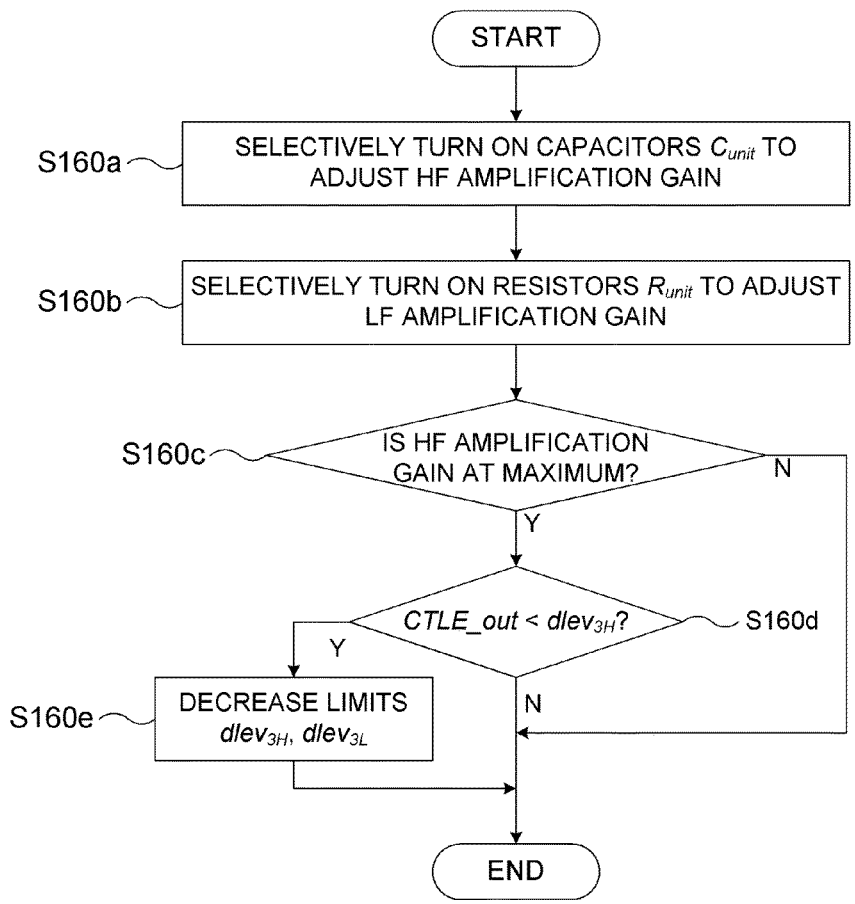
FIG. 13A and FIG. 13B are flow diagrams illustrating, in detail, step S160 and step S260 shown in FIG. 11A and FIG. 11B, respectively.

The step S160 will be described in detail with reference to FIG. 13A,

Referring to FIG. 13A, the plurality of capacitors $C_{unit}$ included in the CTLE 1100 are selectively turned on using the signal EQ_AC[$N_{AC}$−1:0] generated in the step S140 to adjust the high frequency amplification gain of the CTLE 1100 (S160a).

Thereafter, the plurality of resistors $R_{unit}$ included in the CTLE 1100 are selectively turn on using the signal EQ_DC[$N_{DC}$−1:0] generated in step S140 to adjust the low frequency amplification gain of the CTLE 1100 (S160b).

Thereafter, it is determined whether the high frequency amplification gain of the CTLE 1100 is at its maximum (S160c). The reason for determining whether the high frequency amplification gain is at its maximum is to determine whether the upper limit dlev$_{3H}$ is excessively high. For example, when the first voltage level of the signal CTLE_out is lower than the upper limit dlev$_{3H}$ even with the high frequency amplification gain at its maximum by turning on entirety of $N_{AC}$ capacitors $C_{unit}$, the upper limit dlev$_{3H}$ must be lowered as the high frequency amplification gain cannot be increased any further. Therefore, it is necessary to determine whether the high frequency amplification gain is at its maximum.

When the high frequency amplification gain is not at its maximum ("N" in step S160c), the step S160 ends since the high frequency amplification gain can be further increased if necessary.

On the other hand, when the high frequency amplification gain is at its maximum ("Y" in step S160c), it is determined that which one of the first voltage level of the signal CTLE_out and the upper limit $dlev_{3H}$ is higher (S160d).

When the first voltage level of the signal CTLE_out is lower than the upper limit $dlev_{3H}$ even with the high frequency amplification gain at its maximum ("Y" in step S160d), the upper limit $dlev_{3H}$ and the lower limit $dlev_{3L}$ are lowered as the high frequency amplification gain cannot be increased any further (S160e).

When the first voltage level of the signal CTLE_out is higher than or equal to the upper limit $dlev_{3H}$ ("N" in step S160d), the step S160 ends.

The steps S160c through S160e for lowering the upper limit $dlev_{3H}$ and the lower limit $dlev_{3L}$ may be performed when the steps S100 through S170 shown in FIG. 11A are repeatedly performed.

For example, when the first voltage level of the signal CTLE_out obtained from the $(k+1)^{th}$ first training data pattern (where k is a natural number equal to or greater than 2) is not as high as the upper limit $dlev_{3H}$ although the high frequency amplification gain was adjusted to its maximum due to the insufficient first voltage level of the signal CTLE_out obtained from the $k^{th}$ first training data pattern, the controller 1500 may lower both of the upper limit $dlev_{3H}$ and the lower limit $dlev_{3L}$ instead of adjusting the high frequency amplification gain. That is, after lowering the upper limit $dlev_{3H}$ and the lower limit $dlev_{3L}$ until the first voltage level of the signal CTLE_out is between the upper limit $dlev_{3H}$ and lower limit $dlev_{3L}$, the high frequency amplification gain may then be tuned.

Thereafter, as shown in FIG. 11A, the sampling parameter of the sampler is adaptively adjusted according to the data levels $dlev_1$ and $dlev_2$, the upper limit $dlev_{3H}$, the lower limit $dlev_{3L}$ and the threshold voltages $V_{TH01}$, $V_{TH12}$ and $V_{TH23}$ generated in step S150 (S170).

Thereafter, it is determined whether the value of the difference $dlev_{3HD}$, the difference $dlev_{3LD}$, the difference $dlev_{1D}$ or the difference $dlev_{2D}$ is zero (S180).

Specifically, when the value of the difference $dlev_{3HD}$, the difference $dlev_{3LD}$, the difference $dlev_{1D}$ or the difference $dlev_{2D}$ is zero ("Y" in step S180), the method of training PAM4 receiver according to the first embodiment is ended. When the value of the difference $dlev_{3HD}$, $dlev_{3LD}$, $dlev_{1D}$ or $dlev_{2D}$ is not zero ("N" in step S180), the steps S100 through S170 are repeated until the difference $dlev_{3HD}$, $dlev_{3LD}$, $dlev_{1D}$ or $dlev_{2D}$ becomes zero.

Here, it is not necessary that the values of the differences $dlev_{3HD}$, $dlev_{3LD}$, $dlev_{1D}$ and $dlev_{2D}$ be all zero. For example, the steps S100 through S170 may be repeated until the values of the differences $dlev_{3HD}$ and $dlev_{3LD}$ becomes all zero, until the value of the difference $dlev_{3HD}$ becomes zero, or until the values of the differences $dlev_{3HD}$, $dlev_{3LD}$, $dlev_{1D}$, and $dlev_{2D}$ become all zero. In other words, it is possible to select conditions of the repetition as necessary.

The repetition of the steps S100 through S170 means performing the steps S100 through S170 each time the same training pattern (e.g. the training pattern shown in FIG. 10A) is received.

The reason for repeating the steps S100 through S170 is to achieve the goal which is to make the voltage level of the first signal CTLE_out equal to the upper limit $dlev_{3H}$, and the second voltage level of the signal CTLE_out equal to the lower limit $dlev_{3L}$.

In order to achieve this, the high frequency amplification gain and the low frequency amplification gain must be adjusted such that the values of the differences $dlev_{3HD}$, $dlev_{3LD}$, $dlev_{1D}$ and $dlev_{2D}$ become zero or converge to zero. Specifically, since the voltage levels of the signal CTLE_out approaches the upper limit $dlev_{3H}$ and lower limit $dlev_{3L}$ each time the steps S100 through S170 is performed by adjusting the high frequency amplification gain and the low frequency amplification gain, the values of the differences $dlev_{3HD}$, $dlev_{3LD}$, $dlev_{1D}$ and $dlev_{2D}$ become zero or converge to zero as the steps S100 through S170 are repeated.

For example, after the tuning of the high frequency amplification gain and the low frequency amplification gain using a $j^{th}$ training pattern (where j is a natural number) is complete, a $(j+1)^{th}$ training pattern, which is the same as the $j^{th}$ training pattern, is received and used to tune the high frequency amplification gain and the low frequency amplification gain by repeating the same process as described above.

Specifically, the sampler 1200a samples the difference $dlev_{3HD}$ between: the first voltage level of the signal CTLE_out corresponding to the data "11" of the $(j+1)^{th}$ first training data pattern when the transition from the data "00" to the first data "11" occurs; and the upper limit $dlev_{3H}$. Since the signal CTLE_out is the output of CTLE 1100 already trained using the $j^{th}$ first training data pattern, the difference $dlev_{3HD}$ between: the first voltage level of the signal CTLE_out obtained from the $(j+1)^{th}$ first training data pattern; and the upper limit $dlev_{3H}$ is smaller than the difference $dlev_{3HD}$ between: the first voltage level of the signal CTLE_out obtained from the $j^{th}$ first training data pattern; and the upper limit $dlev_{3H}$. Accordingly, the high frequency amplification gain of the CTLE 1100 may be fine-tuned by a more precise signal EQ_AC[$N_{AC}$–1:0] generated by the controller 1500.

Similarly, the difference $dlev_{3LD}$ obtained from the $(j+1)^{th}$ first training data pattern is smaller than the difference $dlev_{3LD}$ obtained from the $j^{th}$ first training data pattern. Accordingly, the low frequency amplification gain of the CTLE 1100 may be fine-tuned by a more precise signal EQ_DC[$N_{DC}$–1:0] generated by the controller 1500.

In addition, since the differences $dlev_{1D}$ and $dlev_{2D}$ obtained from the $(j+1)^{th}$ second training data pattern are smaller than the differences $dlev_{1D}$ and $dlev_{2D}$ obtained from the $j^{th}$ second training data pattern, more precise data levels $dlev_1$ and $dlev_2$ may be obtained.

As described above, when the PAM4 receiver is trained by repeatedly receiving the same training pattern until the differences $dlev_{3HD}$, $dlev_{3LD}$, $dlev_{1D}$ and $dlev_{2D}$ become zero or converge to zero, the PAM4 signal received during the actual use of the PAM4 receiver may be precisely determined despite the attenuation of the transmission line.

Figure 11B:
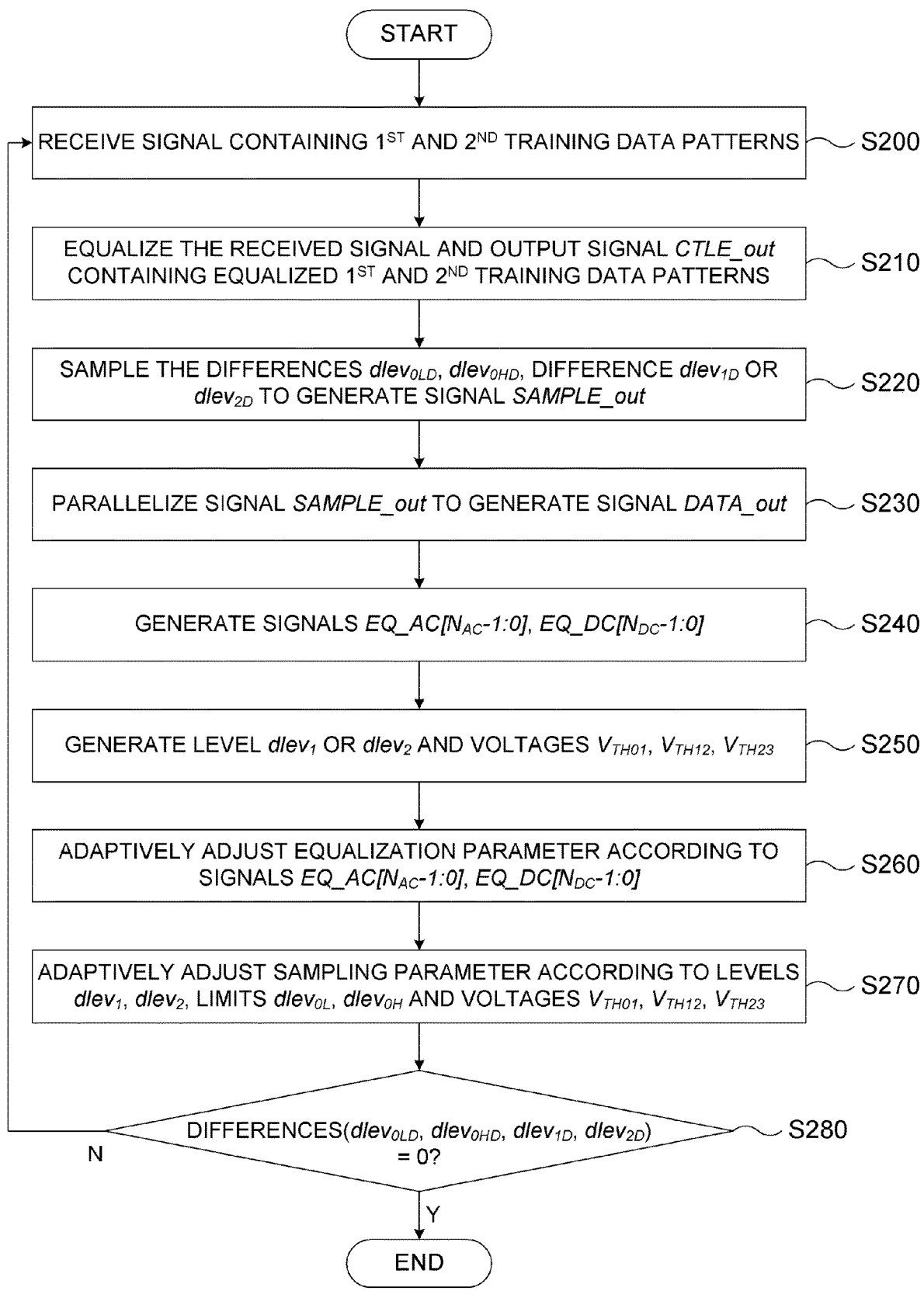

FIG. 11B is a flow diagrams illustrating a method of training the PAM4 receivers according to the first embodiment of the present invention. It is preferable to use the sampler shown in FIG. 9C when training the PAM4 receiver according to the present invention using the training pattern exemplified in FIG. 10B. However, the present invention is not limited thereto.

First, for convenience of describing the present invention, equations $$V_{TH01} = \frac{dlev_0 + dlev_1}{2}, V_{TH12} = \frac{dlev_1 + dlev_2}{2}, \text{ and}$$

$$V_{TH23} = \frac{dlev_2 + dlev_3}{2}$$

are assumed. That is, the threshold voltages $V_{TH01}$, $V_{TH12}$ and $V_{TH23}$ are calculated by the controller 1500 according to the equations and provided to the sampler 1200. In addition, predetermined initial values of the data levels $dlev_{0L}$ and $dlev_{0L}$ are stored in the controller 1500 in advance, and equation $$dlev_0 = \frac{dlev_{0H} + dlev_{0L}}{2}$$

is assumed.

Referring to FIG. 11B, the CTLE 1100 of the PAM4 receiver according to the present invention receives a signal containing the training pattern shown in FIG. 10B (S200). Specifically, the CTLE 1100 shown in FIG. 7 receives the training pattern including the first training data pattern and the second training data pattern.

Thereafter, the CTLE 1100 equalizes the signal received in the step S200 based on the initial equalization parameter, and outputs the signal CTLE_out shown in FIG. 10B (S210). Here, the equalization parameter includes a high frequency amplification gain and a low frequency amplification gain of a linear equalizer.

Specifically, CTLE 1100 equalizes the received signal containing the training pattern according to the initial equalization parameter, and outputs the signal CTLE_out containing equalized first training data pattern and equalized second training data pattern Thereafter, the sampler 1200c samples the signal CTLE_out at the rising edge of the clock signals DCK and DCKB to generate a signal SAMPLE_out (S220).

Specifically, The sampler 1200c shown in FIG. 9C samples the difference $dlev_{OLD}$ which is a difference between: the voltage level of the signal CTLE_out immediately after the transition from the data "11" to the first data "00" of the first training data pattern (i.e. a first voltage level of the signal CTLE_out (denoted by ♦ in FIG. 10B) corresponding to the first data "00" of the equalized first training data pattern when a transition from the data "11" to the first data "00" occurs); and a predetermined lower limit $dlev_{OL}$. The sampled difference $dlev_{OLD}$ is then outputted as the signal SAMPLE_out by the sampler 1200c.

Here, the difference $dlev_{OLD}$ is sampled by the flip-flops 1240-1 and 1240-2 shown in FIG. 9C at the rising edges of the clock signals DCK and DCKB, respectively, and outputted as signals $AEd_{OL}$ and $AOd_{OL}$, respectively. Each of the signals $AEd_{OL}$ and $AOd_{OL}$ may have value of "1" or "0" (representing whether the difference $dlev_{OLD}$ is a positive number or a negative number) depending on the first voltage level (magnitude) of the signal CTLE_out.

In addition, the sampler 1200c shown in FIG. 9C samples the difference $dlev_{OHD}$ which is a difference between: a second voltage level of the signal CTLE_out (denoted by □ in FIG. 10B) corresponding to one of the data after the first data "00" of the first training data pattern (i.e. any one of the second data "00" through the min data "00" of the equalized first training data pattern, where m is a natural number equal to or greater than 2, and an example wherein m=4 is shown in FIG. 10B); and a predetermined upper limit $dlev_{OH}$. The sampled difference $dlev_{OHD}$ is then outputted as the signal SAMPLE_out by the sampler 1200c.

Here, the difference $dlev_{OHD}$ is sampled by the flip-flops 1230-1 and 1230-2 shown in FIG. 9C at the rising edges of the clock signals DCK and DCKB, respectively, and outputted as signals $AEd_{OH}$ and $AOd_{OH}$, respectively. Each of the signals $AEd_{OH}$ and $AOd_{OH}$ may have value of "1" or "0" (representing whether the difference $dlev_{OHD}$ is a positive number or a negative number) depending on the voltage level (magnitude) of the signal CTLE_out.

Thereafter, the signal SAMPLE_out outputted by the sampler 1200c is parallelized and the parallelized signal SAMPLE_out is outputted as the signal DATA_out (S230). Specifically, the DEMUX 1300 generates the signal DATA_out by parallelizing the signal SAMPLE_out. Here, since the signal DATA_out is obtained by parallelizing signal SAMPLE_out, the signal DATA_out contains the signals included in the signal SAMPLE_out of the sampler 1200 such as the differences $dlev_{OLD}$ and $dlev_{OHD}$.

Thereafter, the signals $EQ\_AC[N_{AC}-1:0]$ and $EQ\_DC[N_{DC}-1:0]$ for adjusting the high and the low frequency amplification gains of the CTLE 1100, respectively, are generated from the signal DATA_out (S240).

Specifically, the signals $EQ\_AC[N_{AC}-1:0]$ and $EQ\_DC[N_{DC}-1:0]$ are generated based on the first training data pattern which is used for adjusting the high and the low frequency amplification gains of the CTLE 1100.

Hereinafter, a method of generating the signal $EQ\_AC[N_{AC}-1:0]$ will be described in detail, and a method of generating the signal $EQ\_DC[N_{DC}-1:0]$ will be described in detail thereafter.

The signal $EQ\_AC[N_{AC}-1:0]$ is generated based on the difference $dlev_{OLD}$ contained in the signal DATA_out.

Specifically, as described above, the difference $dlev_{OLD}$ is the difference between: the first voltage level of the signal CTLE_out (denoted by ♦ in FIG. 10B); and the lower limit $dlev_{OL}$. The reason for generating the signal $EQ\_AC[N_{AC}-1:0]$ and using the same to adjust the high frequency amplification gain of CTLE 1100 is to make the first voltage level of the signal CTLE_out equal to the lower limit $dlev_{OL}$.

In the case of the example shown in FIG. 10B, the difference $dlev_{OLD}$ has a positive value since the first voltage level of the signal CTLE_out is higher than the lower limit $dlev_{OL}$.

As a result, the first voltage level of the signal CTLE_out should be decreased in the example shown in FIG. 10B since the goal is to make the first voltage level of the signal CTLE_out equal to the lower limit $dlev_{OL}$.

However, when the transition from the data "11" to the first data "00" of the first training data pattern occurs, the first voltage level of the signal CTLE_out corresponding to the first data "00" varies depending on the high frequency amplification gain of CTLE 1100. Therefore, in order to decrease the first voltage level of the signal CTLE_out, the controller 1500 generates the signal $EQ\_AC[N_{AC}-1:0]$ that increases the high frequency amplification gain of the CTLE 1100 and provides the same to the CTLE 1100. For example, the controller 1500 generates the signal $EQ\_AC[N_{AC}-1:0]$ with increased number of value "1" contained therein and provides the same to the CTLE 1100 such that the number of capacitors $C_{unit}$ turned on by the signal $EQ\_AC[N_{AC}-1:0]$ increases.

On the other hand, when the first voltage level of the signal CTLE_out is lower than the lower limit $dlev_{OL}$, the difference $dlev_{OLD}$ has a negative value.

Similarly, the first voltage level of the signal CTLE_out should be increased since the goal is to make the first voltage level of the signal CTLE_out equal to the lower limit $dlev_{OL}$.

However, when the transition from the data "11" to the first data "00" of the first training data pattern occurs, the first voltage level of the signal CTLE_out corresponding to the first data "00" varies depending on the high frequency amplification gain of CTLE 1100. Therefore, in order to increase the first voltage level of the signal CTLE_out, the controller 1500 generates the signal EQ_AC[$N_{AC}$−1:0] that decreases the high frequency amplification gain of the CTLE 1100 and provides the same to the CTLE 1100. For example, the controller 1500 the signal EQ_AC[$N_{AC}$−1:0] with increased number of value "0" contained therein and provides the same to the CTLE 1100 such that the number of capacitors $C_{unit}$ turned on by the signal EQ_AC[$N_{AC}$−1:0] decreases.

The signal EQ_DC[$N_{DC}$−1:0] is generated based on the difference $dlev_{OHD}$ contained in the signal DATA_out.

Specifically, as described above, the difference $dlev_{OHD}$ is the difference between: the second voltage level of the signal CTLE_out (denoted by □ in FIG. 10B); and the upper limit $dlev_{OH}$. The reason for generating the signal EQ_DC[$N_{DC}$−1:0] and using the same to adjust the low frequency amplification gain of CTLE 1100 is to make the second voltage level of the signal CTLE_out equal to the upper limit $dlev_{OH}$.

In the case of the example shown in FIG. 10B, the difference $dlev_{OHD}$ has a positive value since the second voltage level of the signal CTLE_out is higher than the upper limit $dlev_{OH}$.

As a result, the second voltage level of the signal CTLE_out should be decreased in the example shown in FIG. 10B since the goal is to make the second voltage level of the signal CTLE_out equal to the upper limit $dlev_{OH}$.

However, the second voltage level of the signal CTLE_out corresponding to any one of the second data "00" through the min data "00" of the equalized first training data pattern varies depending on the low frequency amplification gain of CTLE 1100. Therefore, in order to decrease the second voltage level of the signal CTLE_out, the controller 1500 generates the signal EQ_DC[$N_{DC}$−1:0] that increases the low frequency amplification gain of the CTLE 1100 and provides the same to the CTLE 1100. For example, the controller 1500 generates the signal EQ_DC[$N_{DC}$−1:0] with increased number of value "1" contained therein and provides the same to the CTLE 1100 such that the number of resistors $R_{unit}$ turned on by the signal EQ_DC[$N_{DC}$−1:0] increases.

On the other hand, when the second voltage level of the signal CTLE_out is lower than the upper limit $dlev_{OH}$, the difference $dlev_{OHD}$ has a negative value.

Similarly, the second voltage level of the signal CTLE_out should be increased since the goal is to make the second voltage level of the signal CTLE_out equal to the upper limit $dlev_{OH}$.

However, the second voltage level of the signal CTLE_out corresponding to any one of the second data "00" through the min data "00" of the equalized first training data pattern varies depending on the low frequency amplification gain of CTLE 1100. Therefore, in order to increase the second voltage level of the signal CTLE_out, the controller 1500 generates the signal EQ_DC[$N_{DC}$−1:0] that decreases the low frequency amplification gain of the CTLE 1100 and provides the same to the CTLE 1100. For example, the controller 1500 generates the signal EQ_DC[$N_{DC}$−1:0] with increased number of value "0" contained therein and provides the same to the CTLE 1100 such that the number of resistors $R_{unit}$ turned on by the signal EQ_DC[$N_{DC}$−1:0] decreases.

Thereafter, the threshold voltages $V_{TH01}$, $V_{TH12}$ and $V_{TH23}$ of the sampler 1200c (or the sampler 1200d) are generated from the data level $dlev_1$ or $dlev_2$ (S250).

Specifically, the data level $dlev_1$ or $dlev_2$ is generated from the difference $dlev_{1D}$ or $dlev_{2D}$, respectively, and the threshold voltages $V_{TH01}$, $V_{TH12}$ and $V_{TH23}$ of the sampler 1200c (or the sampler 1200d) are generated from the lower limit $dlev_{OL}$, the upper limit $dlev_{OH}$ and the data levels $dlev_0$, $dlev_1$, $dlev_2$ and $dlev_3$.

Figure 12B:
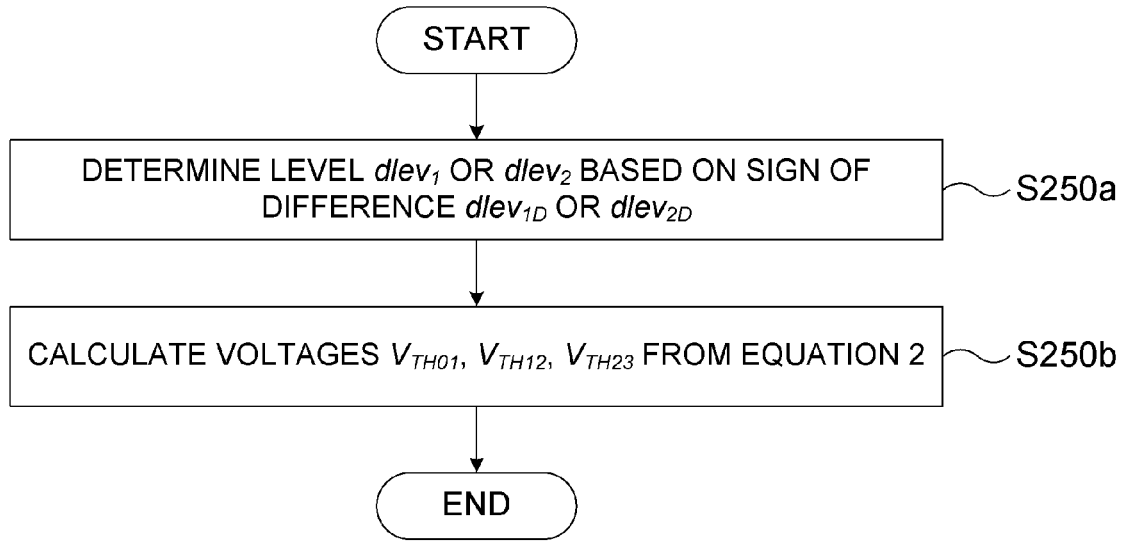

The step S250 includes a step S250a and a step S250b shown in FIG. 12B. Hereinafter, the step S250 will be described in detail with reference to FIG. 12B.

Referring to FIG. 12B, the data level $dlev_1$ and $dlev_2$ are determined according to the signs of the differences $dlev_{1D}$ and $dlev_{2D}$, respectively (S250a).

Specifically, the data levels $dlev_1$ and $dlev_2$ are determined using the second training data pattern.

As shown in FIG. 9C, the sampler 1200c samples the difference $dlev_{2D}$ which is a difference between: a third voltage level (denoted by ▲ in FIG. 10B) of the signal CTLE_out corresponding to the data "10" of the second training data pattern at the rising edge of the clock signals DCK and DCKB; and the data level $dlev_2$. Here, the data level $dlev_2$ has an initial value, and the controller 1500 then adjusts the data level $dlev_2$ according to the sign of the difference $dlev_{2D}$. That is, depending on which one of the third voltage level of the signal CTLE_out and the data level $dlev_2$ is higher, the data level $dlev_2$ is increased or decreased by a predetermined value.

While the sampler 1200c samples the difference $dlev_{2D}$ in FIG. 9C, the difference $dlev_{1D}$, which is a difference between: a fourth voltage level (denoted by ● in FIG. 10B) of the signal CTLE_out corresponding to the data "01" of the second training data pattern at the rising edge of the clock signals DCK and DCKB; and the data level $dlev_1$, may be sampled. In particular, when the data levels $dlev_1$ and $dlev_2$ have the same magnitude and opposite signs (i.e., $dlev_2 = -dlev_1$), it is sufficient when only one of the data levels $dlev_1$ and $dlev_2$ is determined since the other can be automatically determined. However, when the data levels $dlev_1$ and $dlev_2$ have different magnitudes or have the same sign, both of the differences $dlev_{1D}$ and $dlev_{2D}$ may be sampled to adjust both of the data levels $dlev_1$ and $dlev_2$.

Thereafter, the threshold voltages $V_{TH01}$, $V_{TH12}$ and $V_{TH23}$ of the sampler 1200c (or the sampler 1200d) are calculated from the lower limit $dlev_{OL}$, the upper limit $dlev_{OH}$ and the data levels $dlev_0$, $dlev_1$, $dlev_2$ and $dlev_3$ according to the equation 2 below (S250b).

$$dlev_0 = \frac{dlev_{0H} + dlev_{0L}}{2}, V_{TH01} = \frac{dlev_0 + dlev_1}{2}, \quad \text{[Equation 2]}$$

$$V_{TH12} = \frac{dlev_1 + dlev_2}{2}, V_{TH23} = \frac{dlev_2 + dlev_3}{2}$$

Thereafter, as shown in FIG. 11B, the equalization parameter is adaptively adjusted according to the signals EQ_AC[$N_{AC}$−1:0] and EQ_DC[$N_{DC}$−1:0] generated in the step S240 (S260).

The step S260 will be described in detail with reference to FIG. 13B.

Figure 13B:
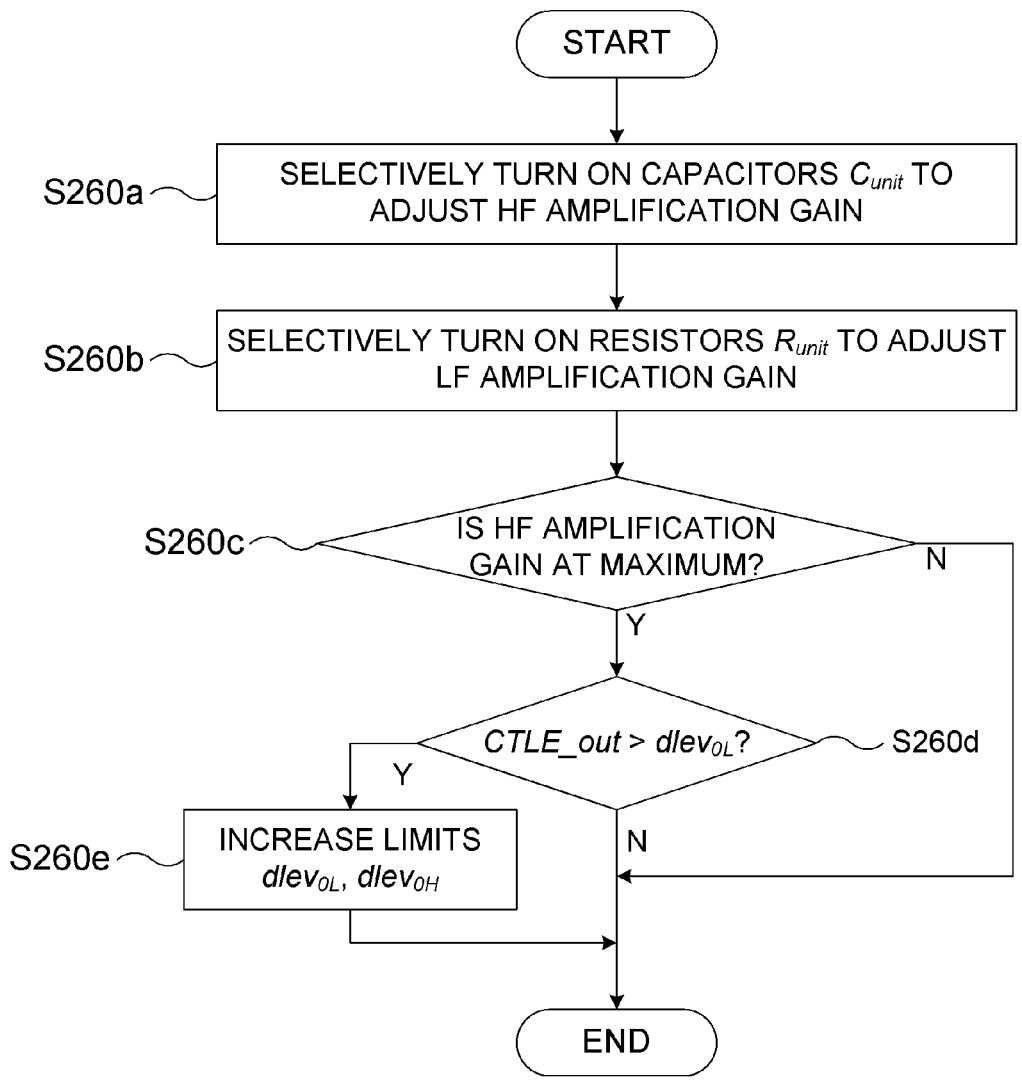

Referring to FIG. 13B, the plurality of capacitors $C_{unit}$ included in the CTLE 1100 are selectively turned on using the signal EQ_AC[$N_{AC}$−1:0] generated in the step S240 to adjust the high frequency amplification gain of the CTLE 1100 (S260a).

Thereafter, the plurality of resistors $R_{unit}$ included in the CTLE 1100 are selectively turn on using the signal EQ_DC [$N_{DC}$−1:0] generated in step S240 to adjust the low frequency amplification gain of the CTLE 1100 (S260b).

Thereafter, it is determined whether the high frequency amplification gain of the CTLE 1100 is at its maximum (S260c). The reason for determining whether the high frequency amplification gain is at its maximum is to determine whether the lower limit $dlev_{OL}$ is excessively low. For example, when the first voltage level of the signal CTLE_out is higher than the lower limit $dlev_{OL}$ even with the high frequency amplification gain at its maximum by turning on entirety of $N_{AC}$ capacitors $C_{unit}$, the lower limit $dlev_{OL}$ must be elevated as the high frequency amplification gain cannot be increased any further. Therefore, it is necessary to determine whether the high frequency amplification gain is at its maximum.

When the high frequency amplification gain is not at its maximum ("N" in step S260c), the step S260 ends since the high frequency amplification gain can be further increased if necessary.

On the other hand, when the high frequency amplification gain is at its maximum ("Y" in step S260c), it is determined that which one of the first voltage level of the signal CTLE_out and the lower limit $dlev_{OL}$ is higher (S260d).

When the first voltage level of the signal CTLE_out is higher than the lower limit $dlev_{OL}$ even with the high frequency amplification gain at its maximum ("Y" in step S260d), the lower limit $dlev_{OL}$ and the upper limit $dlev_{OH}$ are elevated as the high frequency amplification gain cannot be increased any further (S260e).

When the first voltage level of the signal CTLE_out is lower than or equal to the lower limit $dlev_{OL}$ ("N" in step S260d), the step S260 ends.

The steps S260c through S260e for elevating the lower limit $dlev_{OL}$ and the upper limit $dlev_{OH}$ may be performed when the steps S200 through S270 shown in FIG. 11B are repeatedly performed.

For example, when the first voltage level of the signal CTLE_out obtained from the $(k+1)^{th}$ first training data pattern (where k is a natural number equal to or greater than 2) is not as low as the lower limit $dlev_{OL}$ although the high frequency amplification gain was adjusted to its maximum due to the insufficient first voltage level of the signal CTLE_out obtained from the $k^{th}$ first training data pattern, the controller 1500 may elevate both of the lower limit $dlev_{OL}$ and the upper limit $dlev_{OH}$ instead of adjusting the high frequency amplification gain. That is, after elevating the lower limit $dlev_{OL}$ and the upper limit $dlev_{OH}$ until the first voltage level of the signal CTLE_out is between the lower limit $dlev_{OL}$ and upper limit $dlev_{OH}$, the high frequency amplification gain may then be tuned.

Thereafter, as shown in FIG. 11B, the sampling parameter of the sampler is adaptively adjusted according to the data levels $dlev_1$ and $dlev_2$, the lower limit $dlev_{OL}$, the upper limit $dlev_{OH}$ and the threshold voltages $V_{TH01}$, $V_{TH12}$ and $V_{TH23}$ generated in step S250 (S270).

Thereafter, it is determined whether the value of the difference $dlev_{OLD}$, the difference $dlev_{OHD}$, the difference $dlev_{1D}$ or the difference $dlev_{2D}$ is zero (S280).

Specifically, when the value of the difference $dlev_{OLD}$, the difference $dlev_{OHD}$, the difference $dlev_{1D}$ or the difference $dlev_{2D}$ is zero ("Y" in step S280), the method of training PAM4 receiver according to the first embodiment is ended. When the value of the difference $dlev_{OLD}$, $dlev_{OHD}$, $dlev_{1D}$ or $dlev_{2D}$ is not zero ("N" in step S280), the steps S200 through S270 are repeated until the difference $dlev_{OLD}$, $dlev_{OHD}$, $dlev_{1D}$ or $dlev_{2D}$ becomes zero.

Here, it is not necessary that the values of the differences $dlev_{OLD}$, $dlev_{OHD}$, $dlev_{1D}$ and $dlev_{2D}$ be all zero. For example, the steps S200 through S270 may be repeated until the values of the differences $dlev_{OLD}$ and $dlev_{OHD}$ becomes all zero, until the value of the difference $dlev_{OLD}$ becomes zero, or until the values of the differences $dlev_{OLD}$, $dlev_{OHD}$, $dlev_{1D}$, and $dlev_{2D}$ become all zero. In other words, it is possible to select conditions of the repetition as necessary.

The repetition of the steps S200 through S270 means performing the steps S200 through S270 each time the same training pattern (e.g. the training pattern shown in FIG. 10B) is received.

The reason for repeating the steps S200 through S270 is to achieve the goal which is to make the first voltage level of the signal CTLE_out equal to the lower limit $dlev_{OL}$ and the second voltage level of the signal CTLE_out equal to the upper limit $dlev_{OH}$.

In order to achieve this, the high frequency amplification gain and the low frequency amplification gain must be adjusted such that the values of the differences $dlev_{OLD}$, $dlev_{OHD}$, $dlev_{1D}$ and $dlev_{2D}$ become zero or converge to zero. Specifically, since the voltage levels of the signal CTLE_out approaches the lower limit $dlev_{OL}$ and upper limit $dlev_{OH}$ each time the steps S200 through S270 is performed by adjusting the high frequency amplification gain and the low frequency amplification gain, the values of the differences $dlev_{OLD}$, $dlev_{OHD}$, $dlev_{1D}$ and $dlev_{2D}$ become zero or converge to zero as the steps S200 through S270 are repeated.

For example, after the tuning of the high frequency amplification gain and the low frequency amplification gain using a $j^{th}$ training pattern (where j is a natural number) is complete, a $(j+1)^{th}$ training pattern, which is the same as the $j^{th}$ training pattern, is received and used to tune the high frequency amplification gain and the low frequency amplification gain by repeating the same process as described above.

Specifically, the sampler 1200c samples the difference $dlev_{OLD}$ between: the first voltage level of the signal CTLE_out corresponding to the data "00" of the $(j+1)^{th}$ first training data pattern when the transition from the data "11" to the first data "00" occurs; and the lower limit $dlev_{OL}$. Since the signal CTLE_out is the output of CTLE 1100 already trained using the $j^{th}$ first training data pattern, the difference $dlev_{OLD}$ between: the first voltage level of the signal CTLE_out obtained from the $(j+1)^{th}$ first training data pattern; and the lower limit $dlev_{OL}$ is smaller than the difference $dlev_{OLD}$ between: the first voltage level of the signal CTLE_out obtained from the $j^{th}$ first training data pattern; and the lower limit $dlev_{OL}$. Accordingly, the high frequency amplification gain of the CTLE 1100 may be fine-tuned by a more precise signal EQ_AC[$N_{AC}$−1:0] generated by the controller 1500.

Similarly, the difference $dlev_{OHD}$ obtained from the $(j+1)^{th}$ first training data pattern is smaller than the difference $dlev_{OHD}$ obtained from the $j^{th}$ first training data pattern. Accordingly, the low frequency amplification gain of the CTLE 1100 may be fine-tuned by a more precise signal EQ_DC[$N_{DC}$−1:0] generated by the controller 1500.

In addition, since the differences $dlev_{1D}$ and $dlev_{2D}$ obtained from the $(j+1)^{th}$ second training data pattern are smaller than the differences $dlev_{1D}$ and $dlev_{2D}$ obtained from the $j^{th}$ second training data pattern, more precise data levels $dlev_1$ and $dlev_2$ may be obtained.

As described above, when the PAM4 receiver is trained by repeatedly receiving the same training pattern until the differences $dlev_{OLD}$, $dlev_{OHD}$, $dlev_{1D}$ and $dlev_{2D}$ become zero or converge to zero, the PAM4 signal received during the actual use of the PAM4 receiver may be precisely determined despite the attenuation of the transmission line.

The PAM4 receiver and the method for training the same according to the present invention has the following advantages.

(1) The PAM4 receiver and the method for training the same according to the present invention are advantageous in that accurate data reception is achieved by adaptively tuning the PAM4 receiver using the training pattern.

(2) The PAM4 receiver and the method for training the same according to the present invention are advantageous in that long-distance, high-speed communication may be achieved.

What is claimed is:

1. A PAM4 (pulse amplitude modulation 4) receiver comprising:

a CTLE (continuous-time linear equalizer) receiving a signal containing: (i) a first training data pattern containing data "00" and consecutively arranged first data "11" through $m^{th}$ data "11"; and (ii) a second training data pattern including one of data "01", data "10" and combinations thereof, and equalizing the signal according to an equalization parameter of the CTLE including a high frequency amplification gain and a low frequency amplification gain, and outputting a signal CTLE_out containing equalized first training data pattern and equalized second training data pattern;

a sampler sampling: (i) a difference $dlev_{3HD}$; (ii) a difference $dlev_{3LD}$; and (iii) a difference $dlev_{1D}$ or $dlev_{2D}$, and outputting sampled differences as a signal SAMPLE_out, wherein the difference $dlev_{3HD}$ is a difference between: a first voltage level of the signal CTLE_out corresponding to the first data "11" of the equalized first training data pattern when a transition from the data "00" to the first data "11" occurs; and an upper limit $dlev_{3H}$, the difference $dlev_{3LD}$ is a difference between: a second voltage level of the signal CTLE_out corresponding to one of second data "11" through the $m^{th}$ data "11" of the equalized first training data pattern; and a lower limit $dlev_{3L}$, the difference $dlev_{1D}$ is a difference between: a third voltage level of the signal CTLE_out corresponding to the data "01" of the equalized second training data pattern; and the data level $dlev_1$ corresponding to the data "01", and the difference $dlev_{2D}$ is a difference between: a fourth voltage level of the signal CTLE_out corresponding to the data "10" of the equalized second training data pattern; and the data level $dlev_2$ corresponding to data "10";

a DEMUX (demultiplexer) parallelizing the signal SAMPLE_out, and outputting parallelized signal SAMPLE_out as a signal DATA_out;

a CDR (clock-and-data recovery) providing a clock signal for sampling to the sampler and the DEMUX; and a controller: (i) adaptively adjusting a high frequency amplification gain and a low frequency amplification gain of the CTLE by generating and providing a signal EQ_AC[$N_{AC}$−1:0] and a signal EQ_DC[$N_{DC}$−1:0] for adjusting the high frequency amplification gain and low frequency amplification gain based on the difference $dlev_{3HD}$ and the difference $dlev_{3LD}$ in the signal DATA_out, respectively; and (ii) providing the sampler with threshold voltages $V_{TH01}$, $V_{TH12}$ and $V_{TH23}$, the data level $dlev_1$ or $dlev_2$, and the upper limit $dlev_{3H}$ and the lower limit $dlev_{3L}$, wherein the threshold voltages $V_{TH01}$, $V_{TH12}$ and $V_{TH23}$ are calculated from: a data level $dlev_0$ corresponding to the data "00"; the data level $dlev_1$ or $dlev_2$; and a data level $dlev_3$ corresponding to the data "11", the data levels $dlev_1$ and $dlev_2$ are determined from the differences $dlev_{1D}$ and $dlev_{2D}$, respectively; and the data level $dlev_3$ is determined from the upper limit $dlev_{3H}$ and the lower limit $dlev_{3L}$ (where m is a natural number equal to or greater than 2, and $N_{AC}$ and $N_{DC}$ are natural numbers, respectively).

2. The PAM4 receiver of claim 1, wherein the CTLE comprises: a differential amplifier provided with transistors; $N_{AC}$ capacitors $C_{unit}$ connected between sources of the transistors; and $N_{DC}$ resistors $R_{unit}$ connected between the sources of the transistors, and the controller selectively turns on the $N_{AC}$ capacitors $C_{unit}$ according to the signal EQ_AC[$N_{AC}$−1:0] to adaptively adjust the high frequency amplification gain, and selectively turns on the $N_{DC}$ resistor $R_{unit}$ according to the signal EQ_DC[$N_{DC}$−1:0] to adaptively adjust the low frequency amplification gain.

3. The PAM4 receiver of claim 2, wherein the controller lowers the upper limit $dlev_{3H}$ and the lower limit $dlev_{3L}$ when the first voltage level of the signal CTLE_out is lower than the upper limit $dlev_{3H}$ even with the high frequency amplification gain at maximum by turning on an entirety of the $N_{AC}$ capacitors $C_{unit}$.

4. The PAM4 receiver of claim 1, wherein the controller: determines the data level $dlev_1$ or $dlev_2$ based on a sign of the difference $dlev_{1D}$ or $dlev_{2D}$; and provides the sampler with the threshold voltages $V_{TH01}$, $V_{TH12}$ and $V_{TH23}$ thereof calculated according to equations $$dlev_3 = \frac{dlev_{3H} + dlev_{3L}}{2}, \quad V_{TH01} = \frac{dlev_0 + dlev_1}{2},$$

$$V_{TH12} = \frac{dlev_1 + dlev_2}{2} \quad \text{and} \quad V_{TH23} = \frac{dlev_2 + dlev_3}{2}.$$

5. A PAM4 receiver comprising:

a CTLE (continuous-time linear equalizer) receiving a signal containing: (i) a first training data pattern containing data "11" and consecutively arranged first data "00" through $m^{th}$ data "00"; and (ii) a second training data pattern including one of data "01", data "10" and combinations thereof, and equalizing the signal according to an equalization parameter of the CTLE including a high frequency amplification gain and a low frequency amplification gain, and outputting a signal CTLE_out containing equalized first training data pattern and equalized second training data pattern;

a sampler sampling: (i) a difference $dlev_{OLD}$; (ii) a difference $dlev_{OHD}$; and (iii) a difference $dlev_{1D}$ or $dlev_{2D}$, and outputting sampled differences as a signal SAMPLE_out, wherein the difference $dlev_{OLD}$ is a difference between: a first voltage level of the signal CTLE_out corresponding to the first data "00" of the equalized first training data pattern when a transition from the data "11" to the first data "00" occurs; and a lower limit $dlev_{OL}$, the difference $dlev_{OHD}$ is a difference between: a second voltage level of the signal CTLE_out corresponding to one of second data "00" through the $m^{th}$ data "00" of the equalized first training data pattern; and an upper limit dlev$_{OH}$, the difference dlev$_{2D}$ is a difference between: a third voltage level of the signal CTLE_out corresponding to the data "10" of the equalized second training data pattern; and the data level dlev$_2$ corresponding to the data "10", and the difference dlev$_{1D}$ is a difference between: a fourth voltage level of the signal CTLE_out corresponding to the data "01" of the equalized second training data pattern; and the data level dlev$_1$ corresponding to data "01";

a DEMUX (demultiplexer) parallelizing the signal SAMPLE_out, and outputting parallelized signal SAMPLE_out as a signal DATA_out;

a CDR (clock-and-data recovery) providing a clock signal for sampling to the sampler and the DEMUX; and a controller: (i) adaptively adjusting a high frequency amplification gain and a low frequency amplification gain of the CTLE by generating and providing a signal EQ_AC[N$_{AC}$−1:0] and a signal EQ_DC[N$_{DC}$−1:0] for adjusting the high frequency amplification gain and low frequency amplification gain based on the difference dlev$_{0LD}$ and the difference dlev$_{0HD}$ in the signal DATA_out, respectively; and (ii) providing the sampler with threshold voltages V$_{TH01}$, V$_{TH12}$ and V$_{TH23}$, the data level dlev$_1$ or dlev$_2$, and the upper limit dlev$_{OH}$ and the lower limit dlev$_{OL}$, wherein the threshold voltages V$_{TH01}$, V$_{TH12}$ and V$_{TH23}$ are calculated from: a data level dlev$_0$ corresponding to the data "00"; the data level dlev$_1$ or dlev$_2$; and a data level dlev$_3$ corresponding to the data "11", the data levels dlev$_1$ and dlev$_2$ are determined from the differences dlev$_{1D}$ and dlev$_{2D}$, respectively; and the data level dlev$_0$ is determined from the lower limit dlev$_{OL}$ and the upper limit dlev$_{OH}$ (where m is a natural number equal to or greater than 2, and N$_{AC}$ and N$_{DC}$ are natural numbers, respectively).

6. The PAM4 receiver of claim 5, wherein the CTLE comprises: a differential amplifier provided with transistors; N$_{AC}$ capacitors C$_{unit}$ connected between sources of the transistors; and N$_{DC}$ resistors R$_{unit}$ connected between the sources of the transistors, and the controller selectively turns on the N$_{AC}$ capacitors C$_{unit}$ according to the signal EQ_AC[N$_{AC}$−1:0] to adaptively adjust the high frequency amplification gain, and selectively turns on the N$_{DC}$ resistor R$_{unit}$ according to the signal EQ_DC[N$_{DC}$−1:0] to adaptively adjust the low frequency amplification gain.

7. The PAM4 receiver of claim 6, wherein the controller elevates the upper limit dlev$_{OH}$ and the lower limit dlev$_{OL}$ when the first voltage level of the signal CTLE_out is higher than the lower limit dlev$_{OL}$ even with the high frequency amplification gain at maximum by turning on an entirety of the N$_{AC}$ capacitors C$_{unit}$.

8. The PAM4 receiver of claim 5, wherein the controller: determines the data level dlev$_1$ or dlev$_2$ based on a sign of the difference dlev$_{1D}$ or dlev$_{2D}$; and provides the sampler with the threshold voltages V$_{TH}$oi, V$_{TH12}$ and V$_{TH23}$ thereof calculated according to equations $$dlev_0 = \frac{dlev_{0H} + dlev_{0L}}{2}, V_{TH01} = \frac{dlev_0 + dlev_1}{2},$$

$$V_{TH12} = \frac{dlev_1 + dlev_2}{2} \text{ and } V_{TH23} = \frac{dlev_2 + dlev_3}{2}.$$

9. A method of training a PAM4 (pulse amplitude modulation 4) receiver comprising a linear equalizer, a sampler, a DEMUX (demultiplexer) and a controller, the method comprising:

(a) receiving a signal containing: (i) a first training data pattern containing data "00" and consecutively arranged first data "11" through m$^{th}$ data "11"; and (ii) a second training data pattern including one of data "01", data "10" and combinations thereof;

(b) equalizing the signal received in step (a) according to an equalization parameter of the CTLE including a high frequency amplification gain and a low frequency amplification gain, and outputting a signal CTLE_out containing equalized first training data pattern and equalized second training data pattern;

(c) sampling: (i) a difference dlev$_{3HD}$; (ii) a difference dlev$_{3LD}$; and (iii) a difference dlev$_{1D}$ or dlev$_{2D}$ according to a sampling parameter of the sampler, and outputting sampled differences as a signal SAMPLE_out, wherein the difference dlev$_{3HD}$ is a difference between: a first voltage level of the signal CTLE_out corresponding to the first data "11" of the equalized first training data pattern when a transition from the data "00" to the first data "11" occurs; and an upper limit dlev$_{3H}$, the difference dlev$_{3LD}$ is a difference between: a second voltage level of the signal CTLE_out corresponding to one of second data "11" through the m$^{th}$ data "11" of the equalized first training data pattern; and a lower limit dlev$_{3L}$, the difference dlev$_{1D}$ is a difference between: a third voltage level of the signal CTLE_out corresponding to the data "01" of the equalized second training data pattern; and the data level dlev$_1$ corresponding to the data "01", and the difference dlev$_{2D}$ is a difference between: a fourth voltage level of the signal CTLE_out corresponding to the data "10" of the equalized second training data pattern; and the data level dlev$_2$ corresponding to data "10";

(d) parallelizing the signal SAMPLE_out, and outputting parallelized signal SAMPLE_out as a signal DATA_out;

(e) generating a signal EQ_AC[N$_{AC}$−1:0] and a signal EQ_DC[N$_{DC}$−1:0] for adjusting the high frequency amplification gain and low frequency amplification gain based on the difference dlev$_{3HD}$ and the difference dlev$_{3LD}$ in the signal DATA_out, respectively;

(f) generating threshold voltages V$_{TH01}$, V$_{TH12}$ and V$_{TH23}$ of the sampler by calculating the threshold voltages V$_{TH}$oi, V$_{TH12}$ and V$_{TH23}$ from: a data level dlev$_0$ corresponding to the data "00"; the data level dlev$_1$ or dlev$_2$; and a data level dlev$_3$ corresponding to the data "11", wherein the data level dlev$_1$ or dlev$_2$ is determined from the difference dlev$_{1D}$ or dlev$_{2D}$, respectively, and the data level dlev$_3$ is determined from the upper limit dlev$_{3H}$ and the lower limit dlev$_{3L}$;

(g) adaptively adjusting the equalization parameter including the high frequency amplification gain and low frequency amplification using the signal EQ_AC[N$_{AC}$−1:0] and signal EQ_DC[N$_{DC}$−1:0] generated in step (e); and (h) adaptively adjusting the sampling parameter of the sampler according to the threshold voltages V$_{TH}$ol, V$_{TH12}$ and V$_{TH23}$, the data level dlev$_1$ or dlev$_2$, and the upper limit dlev$_{3H}$ and the lower limit dlev$_{3L}$ generated in step (f) (where m is a natural number equal to or greater than 2, and N$_{AC}$ and N$_{DC}$ are natural numbers, respectively).

10. The method of claim 9, further comprising: performing step (a) through step (d) after performing step (a) through step (h) based on the equalization parameter and the sampling parameter adaptively adjusted in step (g) and step (h), respectively.

11. The method of claim 9, wherein step (f) comprises:
(f-1) determining the data level $dlev_1$ or $dlev_2$ based on a sign of the difference $dlev_{1D}$ or $dlev_{2D}$; and
(f-2) calculating the threshold voltages $V_{TH}oi$, $V_{TH12}$ and $V_{TH23}$ according to equations $$dlev_3 = \frac{dlev_{3H} + dlev_{3L}}{2}, V_{TH01} = \frac{dlev_0 + dlev_1}{2},$$
$$V_{TH12} = \frac{dlev_1 + dlev_2}{2} \text{ and } V_{TH23} = \frac{dlev_2 + dlev_3}{2}.$$

12. The method of claim 9, wherein step (g) comprises:
(g-1) selectively turning on $N_{AC}$ capacitors $C_{unit}$ provided in the CTLE according to the signal $EQ\_AC[N_{AC}-1:0]$ to adaptively adjust the high frequency amplification gain; and
(g-2) selectively turning on $N_{DC}$ resistor $R_{unit}$ provided in the CTLE according to the signal $EQ\_DC[N_{DC}-1:0]$ to adaptively adjust the low frequency amplification gain.

13. The method of claim 12, wherein step (g) further comprises:
(g-3) lowering the upper limit $dlev_{3H}$ and the lower limit $dlev_{3L}$ when the first voltage level of the signal CTLE_out is lower than the upper limit $dlev_{3H}$ even with the high frequency amplification gain at maximum by turning on an entirety of the $N_{AC}$ capacitors $C_ut$.

14. A method of training a PAM4 (pulse amplitude modulation 4) receiver comprising a CTLE (continuous-time linear equalizer), a sampler, a DEMUX and a controller, the method comprising:
(a) receiving a signal containing: (i) a first training data pattern containing data "11" and consecutively arranged first data "00" through $m^{th}$ data "00"; and (ii) a second training data pattern including one of data "01", data "10" and combinations thereof;
(b) equalizing the signal received in step (a) according to an equalization parameter of the CTLE including a high frequency amplification gain and a low frequency amplification gain, and outputting a signal CTLE_out containing equalized first training data pattern and equalized second training data pattern;
(c) sampling: (i) a difference $dlev_{OLD}$; (ii) a difference $dlev_{OHD}$; and (iii) a difference $dlev_{1D}$ or $dlev_{2D}$ according to a sampling parameter of the sampler, and outputting sampled differences as a signal SAMPLE_out, wherein the difference $dlev_{OLD}$ is a difference between: a first voltage level of the signal CTLE_out corresponding to the first data "00" of the equalized first training data pattern when a transition from the data "11" to the first data "00" occurs; and a lower limit $dlev_{OL}$, the difference $dlev_{OHD}$ is a difference between: a second voltage level of the signal CTLE_out corresponding to one of second data "00" through the $m^{th}$ data "00" of the equalized first training data pattern; and an upper limit $dlev_{OH}$, the difference $dlev_{2D}$ is a difference between: a third voltage level of the signal CTLE_out corresponding to the data "10" of the equalized second training data pattern; and the data level $dlev_2$ corresponding to the data "10", and the difference $dlev_{1D}$ is a difference between: a fourth voltage level of the signal CTLE_out corresponding to the data "01" of the equalized second training data pattern; and the data level $dlev_1$ corresponding to data "01";

(d) parallelizing the signal SAMPLE_out, and outputting parallelized signal SAMPLE_out as a signal DATA_out;
(e) generating a signal $EQ\_AC[N_{AC}-1:0]$ and a signal $EQ\_DC[N_{DC}-1:0]$ for adjusting the high frequency amplification gain and low frequency amplification gain based on the difference $dlev_{OLD}$ and the difference $dlev_{OHD}$ in the signal DATA_out, respectively;
(f) generating threshold voltages $V_{TH}oi$, $V_{TH12}$ and $V_{TH23}$ of the sampler by calculating the threshold voltages $V_{TH01}$, $V_{TH12}$ and $V_{TH23}$ from: a data level $dlev_0$ corresponding to the data "00"; the data level $dlev_1$ or $dlev_2$; and a data level $dlev_3$ corresponding to the data "11", wherein the data level $dlev_1$ or $dlev_2$ is determined from the difference $dlev_{1D}$ or $dlev_{2D}$, respectively, and the data level $dlev_0$ is determined from the lower limit $dlev_{OL}$ and the upper limit $dlev_{OH}$;
(g) adaptively adjusting the equalization parameter including the high frequency amplification gain and low frequency amplification using the signal EQ_AC $[N_{AC}-1:0]$ and signal $EQ\_DC[N_{DC}-1:0]$ generated in step (e); and
(h) adaptively adjusting the sampling parameter of the sampler according to the threshold voltages $V_{TH01}$, $V_{TH12}$ and $V_{TH23}$, the data level $dlev_1$ or $dlev_2$, and the lower limit $dlev_{OL}$ and the upper limit $dlev_{OH}$ generated in step (f) (where m is a natural number equal to or greater than 2, and $N_{AC}$ and $N_{DC}$ are natural numbers, respectively).

15. The method of claim 14, further comprising: performing step (a) through step (d) after performing step (a) through step (h) based on the equalization parameter and the sampling parameter adaptively adjusted in step (g) and step (h), respectively.

16. The method of claim 14, wherein step (f) comprises:
(f-1) determining the data level $dlev_1$ or $dlev_2$ based on a sign of the difference $dlev_{1D}$ or $dlev_{2D}$, respectively, and
(f-2) calculating the threshold voltages $V_{TH01}$, $V_{TH12}$ and $V_{TH23}$ according to equations $$dlev_0 = \frac{dlev_{0H} + dlev_{0L}}{2}, V_{TH01} = \frac{dlev_0 + dlev_1}{2},$$
$$V_{TH12} = \frac{dlev_1 + dlev_2}{2} \text{ and } V_{TH23} = \frac{dlev_2 + dlev_3}{2}.$$

17. The method of claim 14, wherein step (g) comprises:
(g-1) selectively turning on $N_{AC}$ capacitors $C_{unit}$ provided in the CTLE according to the signal $EQ\_AC[N_{AC}-1:0]$ to adaptively adjust the high frequency amplification gain; and
(g-2) selectively turning on $N_{DC}$ resistor $R_{unit}$ provided in the CTLE according to the signal $EQ\_DC[N_{DC}-1:0]$ to adaptively adjust the low frequency amplification gain.

18. The method of claim 17, wherein step (g) further comprises:
(g-3) elevating the lower limit $dlev_{OL}$ and the upper limit $dlev_{OH}$ when the first voltage level of the signal CTLE_out is higher than the lower limit $dlev_{OL}$ even with the high frequency amplification gain at maximum by turning on an entirety of the $N_{AC}$ capacitors $C_{unit}$.

\* \* \* \* \*